(12) United States Patent  
Nishitani et al.

(10) Patent No.: US 8,965,821 B2
(45) Date of Patent: *Feb. 24, 2015

(54) LEARNING METHOD OF NEURAL NETWORK CIRCUIT

(71) Applicant: Panasonic Corporation, Osaka (JP)

(72) Inventors: Yu Nishitani, Kyoto (JP); Yukihiro Kaneko, Osaka (JP); Michihito Ueda, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/951,448

(22) Filed: Jul. 25, 2013

(65) Prior Publication Data

US 2013/0311414 A1 Nov. 21, 2013

Related U.S. Application Data

(63) Continuation of application No. PCT/JP2012/003492, filed on May 29, 2012.

(30) Foreign Application Priority Data

Jan. 23, 2012 (JP) ................................ 2012-010657

(51) Int. Cl.
- *G06N 3/08* (2006.01)
- *G06N 3/04* (2006.01)
- *G06N 3/063* (2006.01)

(52) U.S. Cl.
CPC .................. *G06N 3/08* (2013.01); *G06N 3/049* (2013.01); *G06N 3/0635* (2013.01)
USPC ........................................................ 706/25

(58) Field of Classification Search
CPC ........... G06N 3/063; G06N 3/08; G06N 3/04; H01L 45/1233; H01L 27/11502
See application file for complete search history.

(56) References Cited

U.S. PATENT DOCUMENTS 5,450,528 A * 9/1995 Chung et al. ..................... 706/25
5,519,812 A * 5/1996 Ishihara .......................... 706/33
(Continued)

FOREIGN PATENT DOCUMENTS

| JP | H-07-114524 | 5/1995 |
| JP | 2009-282782 A | 12/2009 |
| JP | 2010-146514 A | 7/2010 |

OTHER PUBLICATIONS

International Search Report issued in PCT/JP2012/003492 with Date of mailing Aug. 7, 2012.

(Continued)

*Primary Examiner* — Jeffrey A Gaffin
*Assistant Examiner* — Paulinho E Smith
(74) *Attorney, Agent, or Firm* — McDermott Will & Emery LLP

(57) ABSTRACT

A neuron circuit in a neural network circuit element includes a waveform generating circuit for generating a predetermined pulse voltage, and a first input signal has a waveform of the predetermined pulse voltage. For a period having a predetermined duration of the predetermined pulse voltage generated within the neural network circuit element including the variable resistance element which is applied with the first input signal from another neural network circuit element, the first input signal is permitted to be input to the control electrode of the variable resistance element, to change the resistance value of the variable resistance element due to an electric potential difference generated between the first electrode and the control electrode which occurs depending on an input timing of the first input signal with respect to the period during which the first input signal is permitted to be input to the control electrode.

12 Claims, 22 Drawing Sheets

(56) References Cited

U.S. PATENT DOCUMENTS

| | | | |
|---|---|---|---|
| 5,630,023 A | 5/1997 | Oteki | |
| 6,470,328 B1* | 10/2002 | Varshavsky | 706/33 |
| 6,847,071 B2* | 1/2005 | Ueda et al. | 257/295 |
| 8,441,835 B2* | 5/2013 | Jo et al. | 365/148 |
| 8,614,432 B2* | 12/2013 | Pickett et al. | 257/1 |
| 8,658,476 B1* | 2/2014 | Sun et al. | 438/132 |
| 8,775,346 B2* | 7/2014 | Nishitani et al. | 706/45 |
| 2006/0294034 A1 | 12/2006 | Fuji | |
| 2008/0162391 A1 | 7/2008 | Izhikevich | |
| 2008/0275832 A1* | 11/2008 | McDaid et al. | 706/33 |
| 2009/0014708 A1* | 1/2009 | Sasago et al. | 257/4 |
| 2009/0043722 A1* | 2/2009 | Nugent | 706/25 |
| 2009/0097299 A1* | 4/2009 | Tanaka et al. | 365/145 |
| 2012/0008365 A1* | 1/2012 | Kaneko | 365/145 |
| 2012/0217997 A1* | 8/2012 | Kaneko | 326/38 |
| 2013/0087755 A1* | 4/2013 | Prodromakis et al. | 257/2 |
| 2013/0094274 A1* | 4/2013 | Kaneko | 365/145 |
| 2013/0311414 A1* | 11/2013 | Nishitani et al. | 706/25 |
| 2013/0311415 A1* | 11/2013 | Nishitani et al. | 706/26 |
| 2014/0112051 A1* | 4/2014 | Kaneko | 365/145 |

OTHER PUBLICATIONS

Wolfgang Maass, "Networks of Spiking Neurons: The Third Generation of Neural Network Models," Neural Networks, vol. 10, No. 9, pp. 1659-1671, 1997.

* cited by examiner

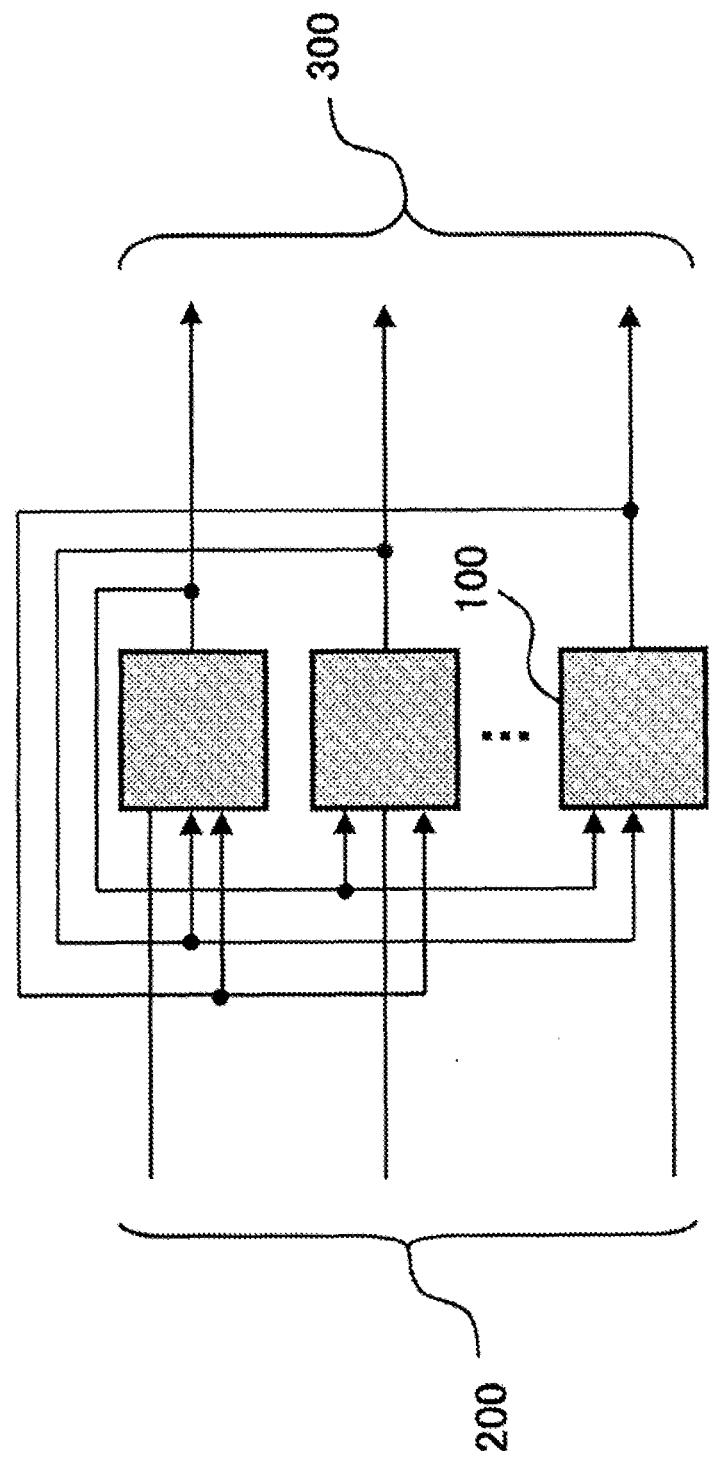

LEARNING METHOD OF NEURAL NETWORK CIRCUIT

CROSS REFERENCE TO RELATED APPLICATION

This is a continuation application under 35 U.S.C. 111(a) of pending prior International application No. PCT/JP2012/003492, filed on May 29, 2012.

BACKGROUND OF THE INVENTION

1. Field of the Invention

The present invention relates to a learning method of a neural network circuit.

2. Description of the Related Art

At present, computers have been developed remarkably and utilized in various daily scenes. However, so far, development of processing abilities of the computers have been achieved by miniaturization of components (parts) and progresses of algorithms, and basic principles of information processing have not changed. Meanwhile, because of characteristics of processing methods, the computers have a drawback that they are very weak in operations which can be performed easily by humans. For example, the computers are weak in real-time face recognition, understanding of space structures, etc. Processing speeds of these operations of the computers are much lower than those of humans, even if latest algorithms and maximum-scale computers are used.

Under the circumstances, computers which simulate information processing methods of brains of living bodies have been studied. A basic processing model of these processing methods is a neural network.

The neural network is a simulation of a neuron network of a living body. It is known that nerve cells of the living body communicate (give and take) pulses (spike pulses) of a substantially fixed shape. As a neural network circuit which realizes the neural network, there has been proposed a model which truly simulates a neural circuit of a living body and directly handles the pulses. For example, Japanese Laid-Open Patent Application Publication No. Hei. 7-114524 (hereinafter will be referred to as literature 1) discloses a model (pulse density model) representing information using pulse density. This model is an example of a model which represents analog information using the number of pulses propagating for a specified time. Also, Japanese Laid-Open Patent Application Publication No. 2010-146514 (hereinafter will be referred to as literature 2) discloses a model (pulse timing model) which represents information using pulse timings. This model represents analog information using pulses and time intervals of the pulses. These models which use pulse signals have an advantage that hardware can be easily implemented because signals communicated between neurons have a fixed waveform. However, in the pulse density model disclosed in literature 1, it is necessary to extract the pulse density, which requires a certain time to represent the information. Therefore, this pulse density model has a drawback that it cannot represent behaviors of neurons in a minute time scale (time factor). By comparison, the pulse timing model disclosed in literature 2 is able to represent the information using every individual pulse, and therefore execute information processing at a higher speed than the pulse density model.

For example, "W. Maass, "Networks of Spiking Neurons: The Third Generation of Neural Network Models", Neural Networks, vol. 10, no. 9, pp. 1659-1671, 1997". (hereinafter will be referred to as literature 3) discloses that higher performance is attained by using the pulse timing model than by using the pulse density model.

SUMMARY OF THE INVENTION

However, the neural network circuit which implements the pulse timing model disclosed in literature 2 has a problem that a circuit area of the whole neural network circuit increases.

The present invention has been developed under the circumstances, and an object of the present invention is to provide a learning method of a neural network circuit which is able to implement a learning operation using pulse timings with a configuration in which elements are less in number.

According to the present invention, there is provided a learning method of a neural network circuit including a plurality of neural network circuit elements which are interconnected, wherein each of the plurality of neural network circuit elements includes: at least one synapse circuit which receives as an input a signal (first input signal) output from another neural network circuit element; and one neuron circuit which receives as an input a signal output from the at least one synapse circuit, wherein the synapse circuit includes a variable resistance element which includes a first electrode formed on and above a semiconductive layer; a second electrode formed on and above the semiconductive layer; and a control electrode formed on a main surface of the semiconductive layer via a ferroelectric layer, and changes a resistance value between the first electrode and the second electrode in response to an electric potential difference between the first electrode and the control electrode; wherein the neuron circuit includes a waveform generating circuit for generating a bipolar sawtooth pulse voltage or a mexican-hat pulse voltage (hereinafter referred to as predetermined pulse voltage), and the first input signal has a waveform of the predetermined pulse voltage; wherein for a period having a predetermined duration before and after a temporal mid point of the waveform of the predetermined pulse voltage generated within the neural network circuit element including the variable resistance element which is applied with the first input signal from another neural network circuit element, the first input signal is permitted to be input to the control electrode of the variable resistance element, to change the resistance value of the variable resistance element due to an electric potential difference generated between the first electrode and the control electrode which occurs depending on an input timing of the first input signal with respect to the period during which the first input signal is permitted to be input to the control electrode of the variable resistance element.

In accordance with the present invention, learning operation using pulse timings can be implemented with a configuration in which elements are less in number.

The above and further objects and features of the invention will more fully be apparent from the following detailed description with accompanying drawings.

BRIEF DESCRIPTION OF THE DRAWINGS

FIG. 11B is a schematic view showing an interconnected neural network.

DETAILED DESCRIPTION OF THE PREFERRED EMBODIMENT

[Explanation of Neural Network]

Figure 11A:
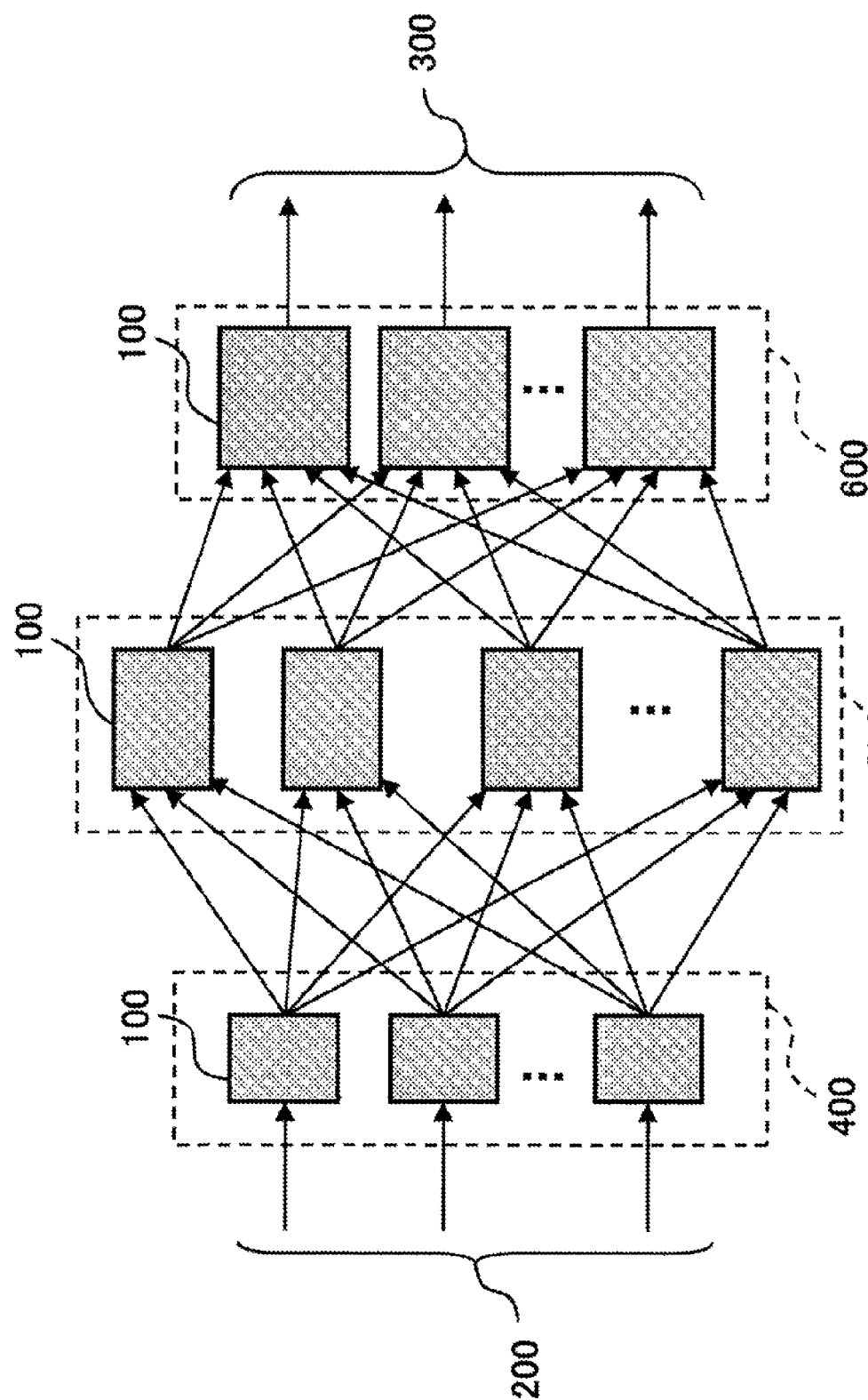
FIG. 11A is a schematic view showing a hierarchical neural network.

First of all, a detailed description will be given of a neural network which is the premise of the present embodiment of the present invention and a problem associated with the conventional neural network circuit which should be solved by the neural network of the present embodiment of the present invention. The neural network is a simulation of a neuron network of a living body. The neural network performs information processing in such a manner that a plurality of neurons which are a simulation of nerve cells as functional units in the neuron network are arranged in a network form. As examples of the neural network, there are a hierarchical neural network in which neurons 100 are connected in a layered form as shown in FIG. 11A, or an interconnected neural network (Hopfield network) in which the neurons 100 are interconnected as shown in FIG. 11B.

The neural network has major two functions. One of these functions is a "processing" function which derives an output from an input. The other of these functions is a "learning" function which sets a desired relation of input/output in the whole neural network.

[Processing Function]

Now, an operation in information processing will be described using a hierarchical neural network circuit as an example. Referring now to FIG. 11A, the hierarchical neural network circuit includes three layers which are an input layer 400, a hidden layer 500, and an output layer 600. Each of the input layer 400, the hidden layer 500, and the output layer 600 includes at least one neuron 100. The neuron(s) 100 in the input layer 400 is/are connected to the neuron(s) 100 in the hidden layer 500. In the same manner, the neuron(s) 100 in the hidden layer 500 is/are connected to the neuron(s) 100 in the output layer 600. Signals 200 are input to the input layer 400, propagate through the hidden layer 500, and then the output layer 600, and are output from the output layer 600. Each of the neurons 100 performs predetermined computation on an input value as will be described later, and propagates the resultant output value to the neurons 100 in the next layer. Therefore, the value output from the output layer 600 is a final output 300 of the network. This series of operation is information processing occurring in the neural network circuit. If many neurons 100 are provided in the hidden layer 500, a desired input/output is attained. Although the hierarchical neural network circuit of FIG. 11A includes the three layers, it may include a plurality of hidden layers 500.

Figure 12:
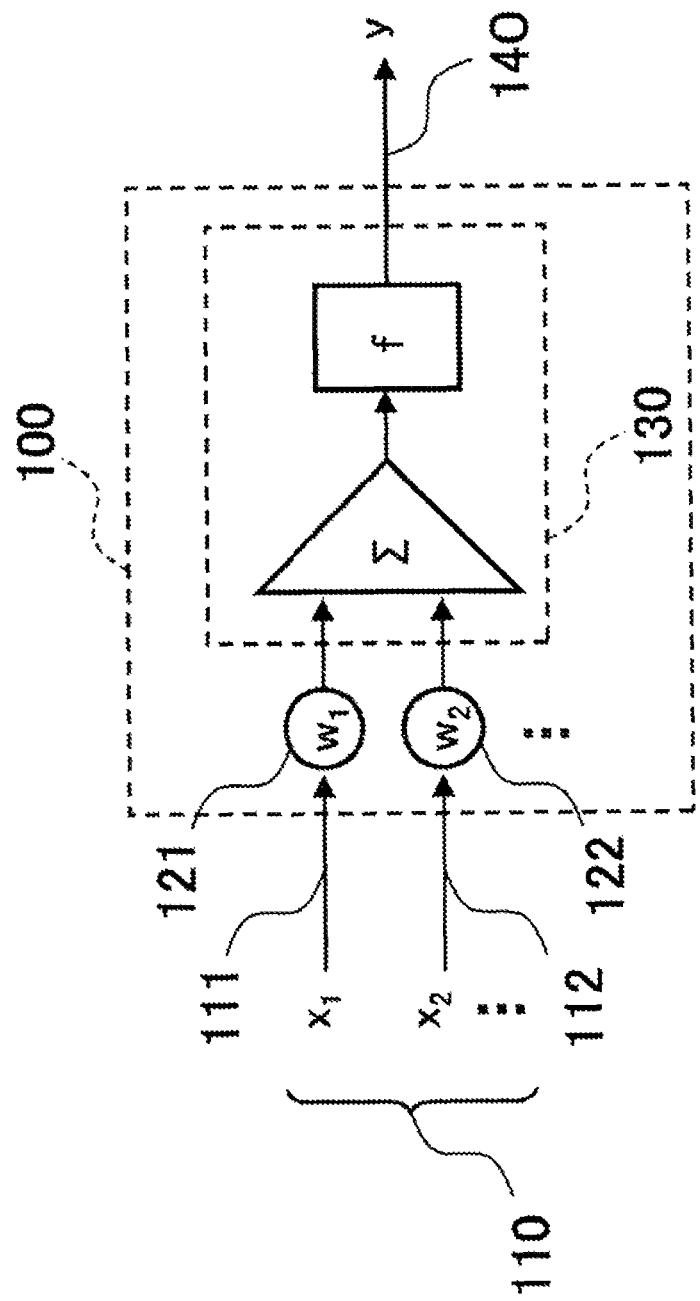
FIG. 12 is a schematic view showing an operation of a general neuron.

Next, the neurons which are the functional units in the neural network circuit will be described. FIG. 12 is a schematic view of the neuron. Referring to FIG. 12, the neuron (particular neuron) 100 includes synapse sections 121 and 122, and a neuron section 130. The synapse sections 121 and 122 are equal in number to the neurons 100 in the previous stage to which the particular neuron 100 is connected, i.e., input signals. The synapse sections 121 and 122 weight (perform weighting on) a plurality of input signals 111 and 112 from outside, respectively. Weighting values ($w_1$, $w_2$) will be hereinafter referred to as synaptic weights. The neuron section 130 computes a value of a sum of the input signals weighted by the synapse sections 121 and 122, performs non-linear computation on the value of the sum, and outputs the resultant value. When the input signals from outside are expressed as $x_i$ (1, 2, ..., n), n is equal in number to the input signals. As represented by a formula 1, the synapse sections 121 and 122 perform multiplication on the input signals, using the corresponding synaptic weights $x_i$ (1, 2, ..., n), and the neuron section 130 computes a sum $V_n$ of the weighted values.

$$V_n = \Sigma w_i x_i \quad \text{(formula 1)}$$

where $\Sigma$ is a summation sign of i.

The neuron section 130 performs non-linear computation f on the sum $V_n$, and derives an output value y. Therefore, the output y of the neuron section 130 is represented by a formula 2:

$$y = f(Vn) \quad \text{(formula 2)}$$

As the non-linear function f, a monotonically increasing function having saturation characteristics is used. For example, a step function or a sigmoid function is often used.

In the neural network, the plurality of neurons are able to perform computation concurrently. Therefore, the neural network has a parallel processing ability. That is, unlike serial information processing of the conventional computer, the neural network is able to perform parallel information processing, which is one of the features of the neural network.

[Learning Function]

In addition to the above mentioned processing function which derives the output from the input, the neural network has the "learning function" which is an important feature. As defined herein, the learning refers to updating of the above stated synaptic weights, and setting of a desired input/output relation in the whole neural network circuit.

[Pulse Neuron Model]

Thus far, the processing function and the learning function of the neural network have been described in detail. In the model described above, the signals propagating between the neurons are current or electric potential values represented by analog value forms. On the other hand, it is known that nerve cells of the living body communicate (give and take) pulses (spike pulses) of a substantially fixed shape. Accordingly, there has been proposed a model which truly simulates the neural circuit of the living body and directly handles the pulses. For example, literature 1 discloses the model (pulse density model) representing information using the pulse density. This model is an example of a model which represents analog information using the number of pulses propagating for a specified time. Also, literature 2 discloses the model (pulse timing model) which represents information using pulse timings. This model represents analog information using pulses and time intervals of the pulses. These models which use pulse signals have an advantage that the neural network can be easily implemented as hardware as will be described later, because signals communicated between neurons have a fixed waveform. However, in the pulse density model disclosed in literature 1, it is necessary to extract the pulse density, which requires a certain time to represent the information. Therefore, this pulse density model has a drawback that it cannot represent the behaviors of the neurons in a minute time scale (time factor). By comparison, the pulse timing model is able to represent the information using every individual pulse, and therefore execute information processing at a higher speed than the pulse density model. For example, literature 3 discloses that higher performance is attained by using the pulse timing model than by using the pulse density model.

As the operation model of the neurons which is applicable to the information representation using the pulses, there has been proposed an integrate-and-fire model. Now, the integrate-and-fire model operation of the neuron having two input terminals will be described with reference to FIG. 13.

Figure 13:
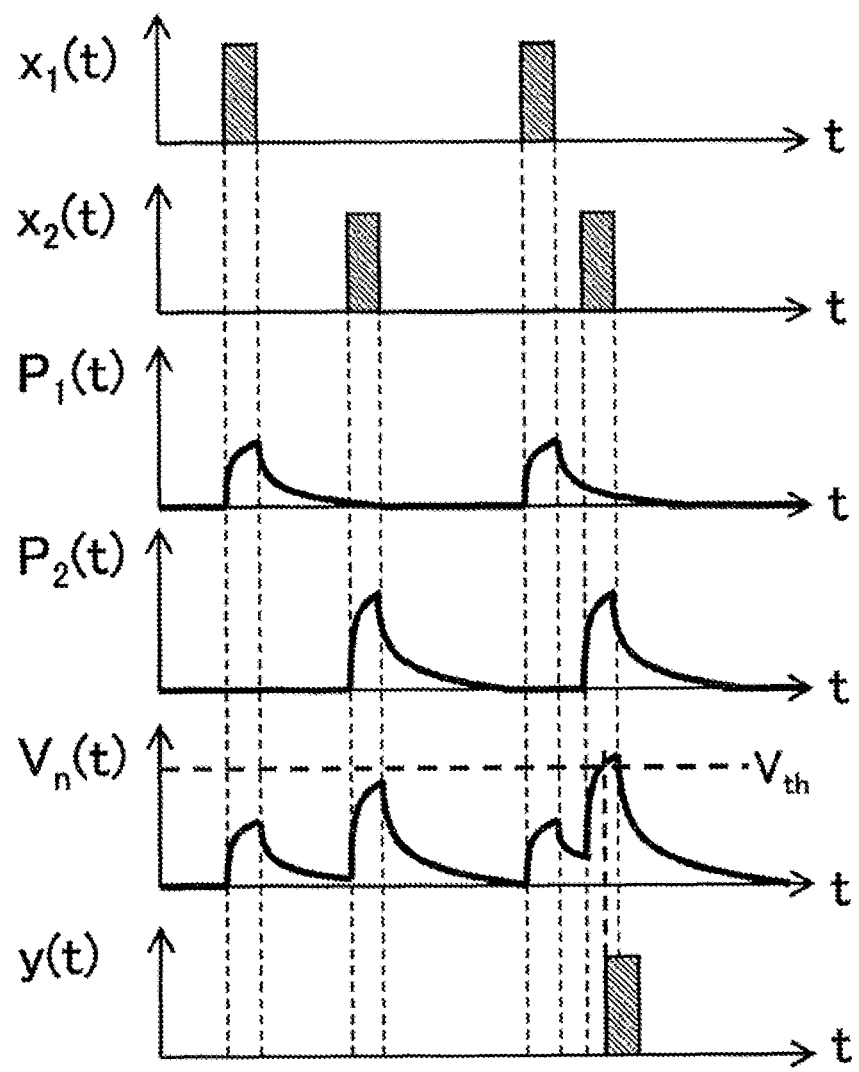
FIG. 13 is a schematic view showing an operation of an integrate-and-fire (IF) neuron.

Referring to FIG. 13, from outside or another neuron, a pulse $x_1$ is input to a synapse 1 and a pulse $x_2$ is input to a synapse 2. At timings at which the pulses $x_1$ and $x_2$ are input to the synapses 1 and 2, respectively, a single-peaked voltage change occurs in each of the synapse sections 121 and 122. Such an electric potential in the synapse section 121 and 122, is referred to as a post-synaptic potential (hereinafter abbreviated as "PSP"). FIG. 13 indicate a change $P_1(t)$ in the PSP in the synapse 1 and a change $P_2(t)$ in the PSP in the synapse 2, respectively, which change occur with time. A height of the PSP is proportional to strength of the synaptic weight. t indicates time.

The neuron computes a sum of the PSPs from all of the synapses connected to the neuron. The sum is referred to as an internal electric potential $V_n(t)$ of the neuron. In a case where the neuron has two input terminals, the internal electric potential $V_n(t)$ is a sum of $P_1(t)$ and $P_2(t)$, as can be seen from FIG. 13. In general, the internal electric potential $V_n(t)$ is represented by a formula 3:

$$V_n(t)=\Sigma P_i(t) \quad \text{(formula 3)}$$

where $P_i$ is the PSP in a synapse i, and $\Sigma$ is a summation sign of i.

As shown in FIG. 13, when the internal electric potential $V_n(t)$ exceeds a predetermined threshold $V_{th}$, the corresponding neuron outputs the pulse signal y. This is called "fire" of the neuron. The pulse output y is output from the neuron, and input to other neurons after a passage of a certain transmission time $t_{Delay}$.

In a case where information representation using the pulse timings is used, the pulse timings can also be used in updating of the synaptic weight in the learning operation. Especially, a learning operation using a characteristic called "spike-timing dependent synaptic plasticity (hereinafter will be abbreviated as "STDP") has attracted an attention. The STDP refers to a characteristic in which the synaptic weight of a particular synapse 1 changes depending on a timing at which a neuron (previous neuron) which sends a signal to the particular synapse 1 fires and a timing at which a neuron (post neuron) which receives a signal weighted by the particular synapse 1 fires. Several kinds of STDPs of nerve cells of an actual living body have been observed.

Figure 14A:
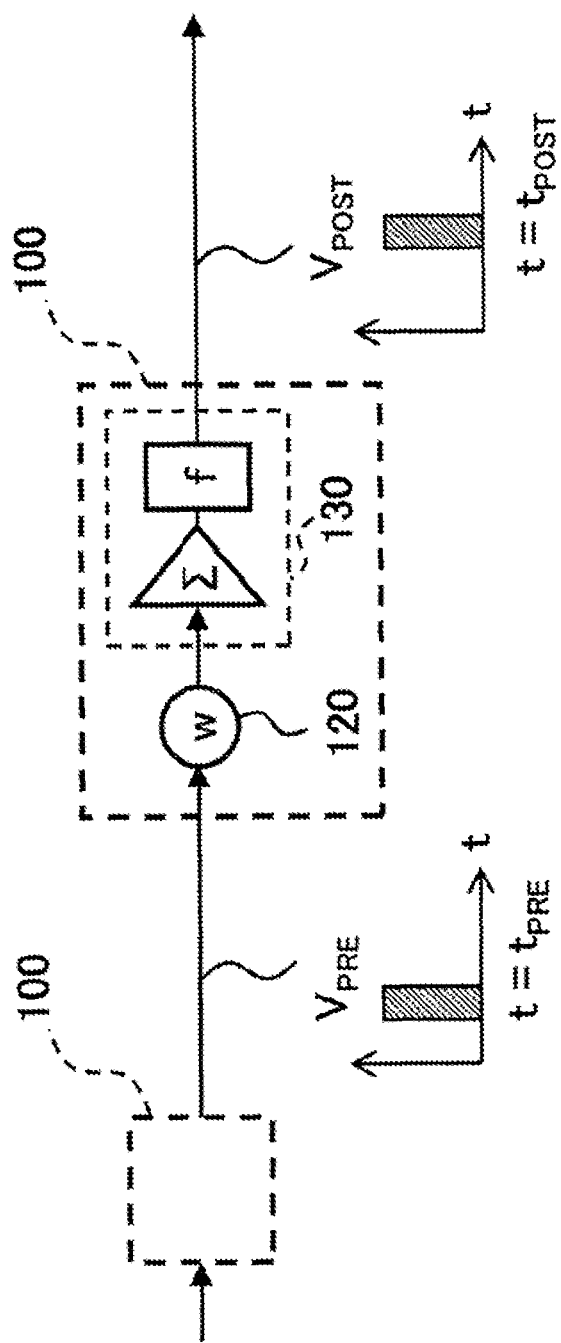
FIG. 14A is a schematic view for explaining the STDP.
Figure 14B:
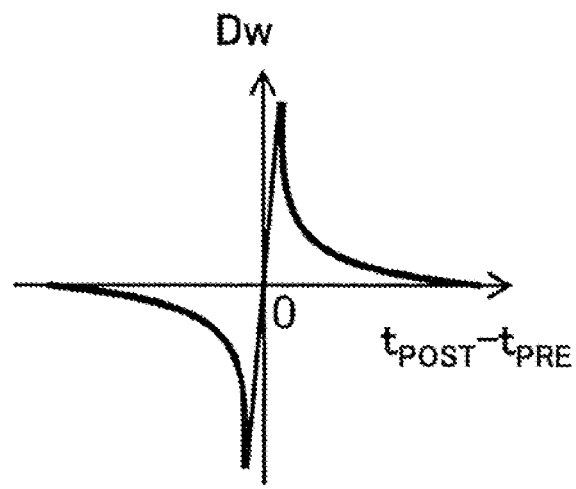
FIG. 14 B is a schematic view showing a characteristic of non-symmetric STDP.
FIG. 14C is a schematic view showing symmetric STDP.
Figure 14C:
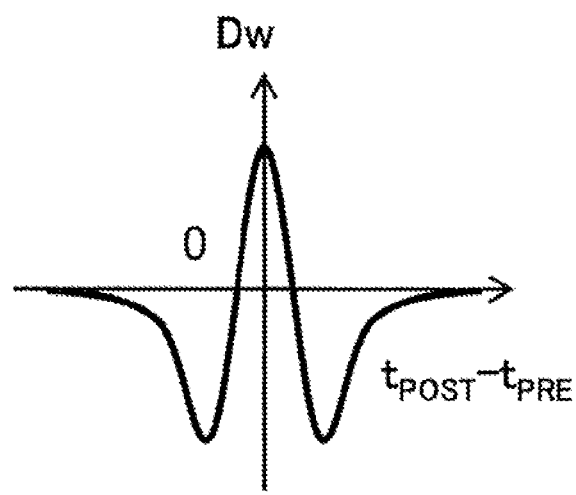

With reference to FIG. 14A, the STDP will be described. As shown in FIG. 14A, a timing at which the previous neuron connected to the synapse 120 fires is $t_{PRE}$ and a timing at which the post neuron connected to the synapse 120 fires is $t_{POST}$. The STDP is a characteristic in which the synaptic weight w of the synapse 120 changes according to a time difference $(t_{POST}-t_{PRE})$ which is a difference between $t_{PRE}$ and $t_{POST}$, as a function. Roughly, there are two kinds of STDPs. The characteristic of FIG. 14B is non-symmetric STDP, in which a change amount $\Delta w$ of the synaptic weight w depends on a time order of pulses in addition to the time difference $(t_{POST}-t_{PRE})$ between these pulses. The characteristic of FIG. 14C is symmetric STDP, in which a change amount $\Delta w$ of the synaptic weight w is determined by only a function of the time difference $(t_{POST}-t_{PRE})$ between the two pulses and does not depend on the order of the pulses.

[Configuring of Integrated Circuit]

Thus, far, the outline of the neutral network has been described in detail. How the above mentioned functions of the neurons are implemented becomes an issue in configuring of the neural network. In the past, a method of implementing the functions of the neurons in software processing, using the conventional computer, has been employed in many cases. However, in this case, a CPU executes processing in a plurality of neurons by time division. Therefore, the parallel information processing is not executed. Because of this, it is essential that neurons be constructed using hardware and configured into an integrated circuit.

Figure 15:
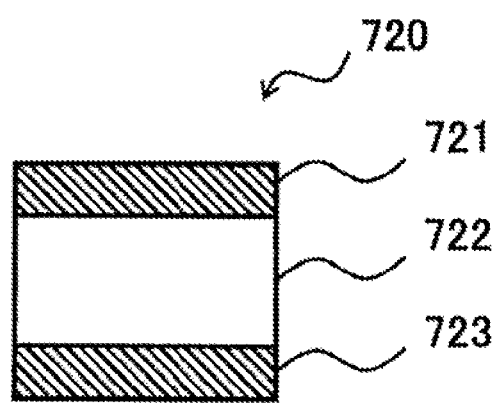
FIG. 15 is a cross-sectional view showing a variable resistance memory element disclosed in literature 2.

As described above, it is suggested that the neural network based on the information representation using the pulse timings is able to implement high performance. Since the signals communicated between the neurons are fixed-waveform signals, the neural network is easily configured into hardware. Because of this, in recent years, implementation of the neural network as hardware incorporating the learning function using the STDP, i.e., implementation of the neural network circuit has been studied vigorously. In the conventional neural network circuit incorporating the learning function using the STDP, implementation of the element adapted to store the synaptic weight as analog quantity is the biggest challenge. Regarding this, for example, literature 2 discloses a method of storing a variable resistance value of a variable resistance memory element as a synaptic weight. FIG. 15 is a cross-sectional view schematically showing a variable resistance memory element 720 disclosed in literature 2. The variable resistance memory element 720 has a structure in which a metal oxide layer 722 is sandwiched between an upper electrode 721 and a lower electrode 723. In the variable resistance memory element 720, by applying a voltage between the upper electrode 721 and the lower electrode 723, a resistance value between the upper electrode 721 and the lower electrode 723 changes in a non-volatile manner depending on a value of a current flowing therethrough.

Figure 16A:
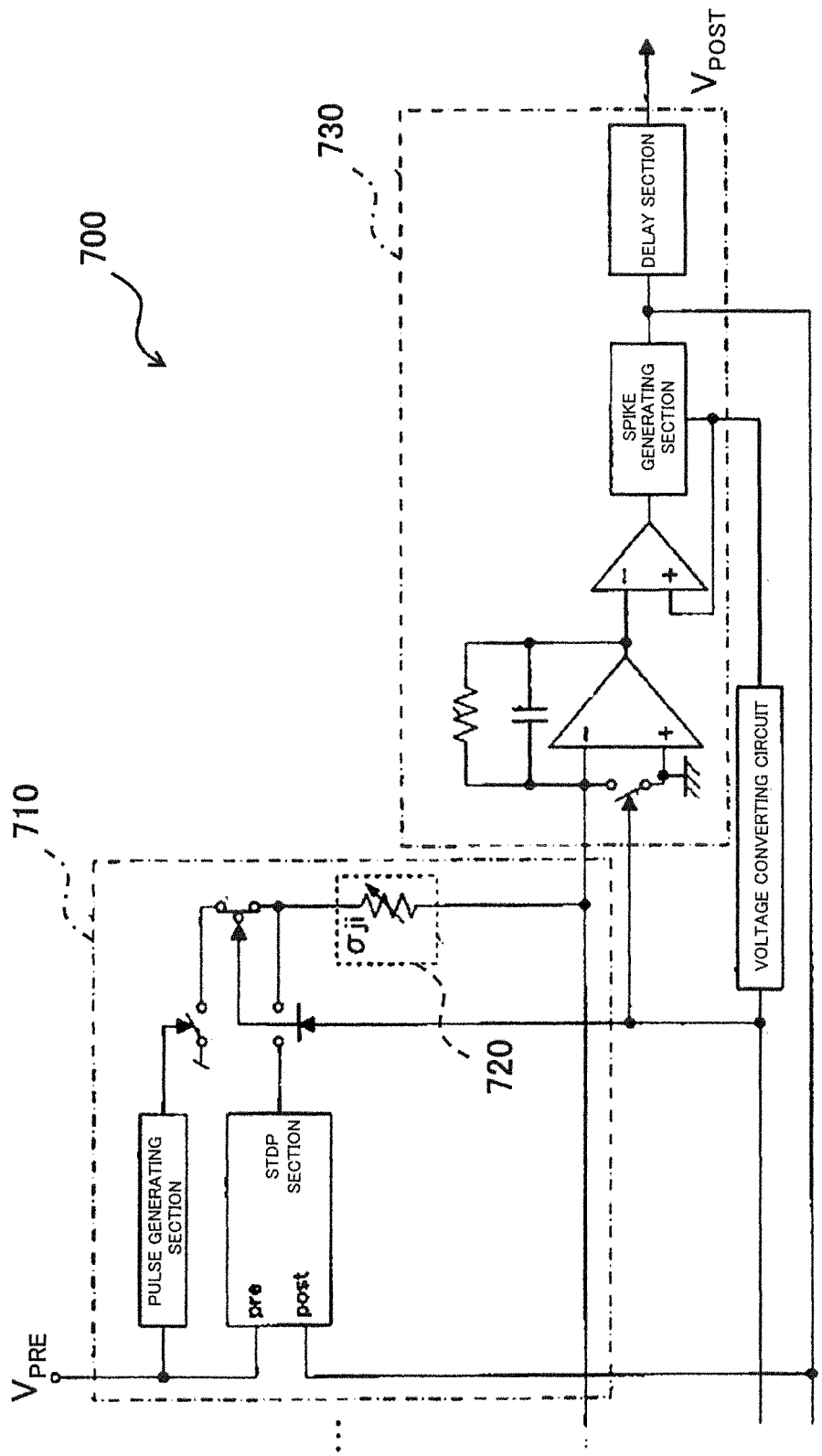
FIG. 16A is a block diagram showing the conventional STDP neural network circuit element disclosed in literature 2.
Figure 16B:
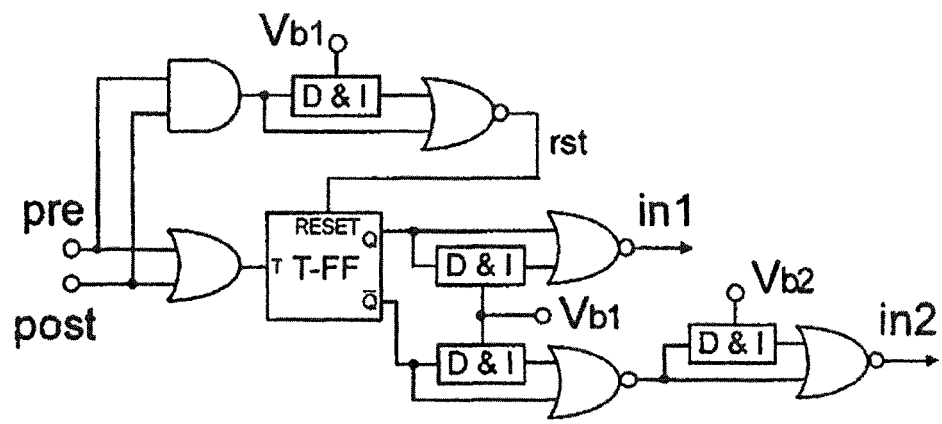
FIG. 16B is a block diagram showing a STDP section in the conventional synapse circuit disclosed in literature 2.
Figure 16C:
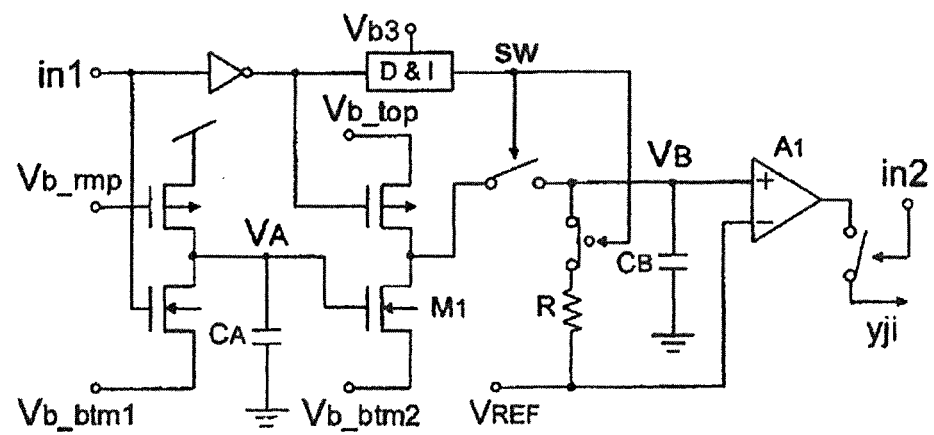
FIG. 16C is block diagram showing a STDP section in the conventional synapse circuit disclosed in literature 2.

FIG. 16A is a block diagram showing the conventional STDP neural network circuit element disclosed in literature 2. The neural network circuit element is defined as representation of the neurons as the functional units in the neural network, as the hardware. The neural network circuit element 700 includes a plurality of synapse circuits 710 and one neuron circuit 730. The synapse circuit 710 is configured to store the synaptic weight in a variable resistance memory element 720. By changing the resistance value of the variable resistance memory element 720 by the above method, the learning function is implemented. FIGS. 16B and 16C are circuit diagrams disclosed in literature 2, showing a specific configuration of the STDP section of FIG. 16A.

As can be seen from FIGS. 11A and 11B, to configure the neural network circuit, a plurality of input terminals are required for one neuron circuit. As the neural network circuit elements in the whole neural network circuit increase in number, input terminals required for one neuron circuit increase in number correspondingly. Synapse circuits which are equal in number to the input terminals are required for one neuron circuit. Therefore, if the neural network circuit is configured to include many neural network circuit elements, numerous synapse circuits are required. For example, in the interconnected neural network of FIG. 11B, when the number of neurons is n, the number of necessary synapses is a square of n. Therefore, to reduce an area of the neural network circuit, it is important to simplify the configuration of the synapse circuit.

In the conventional neural network circuit element 700, the signal propagating to the neuron circuit 730 and a signal used to update the synapse weight stored in the variable resistance memory element 720 using the STDP are generated within the synapse circuit 710. For example, the signals are generated in a pulse generating section and a STDP section in FIG. 16A. Because of this, the synapse circuit 710 is required to include a signal generator and a computing circuit as shown in FIGS. 16B and 16C, which increases a scale of the configuration of the synapse circuit 710.

As should be understood from the above, the conventional synapse circuit 710 and the driving method thereof have a problem that the area of the synapse circuit 710 increases significantly, and hence the neural network circuit including the synapse circuit 710 increases in scale.

To solve the above mentioned problems, the present inventors intensively studied, and discovered the following as the learning method of the neural network circuit and the neural network circuit, which are able to implement a learning operation using the STDP with a configuration in which elements are less in number.

The present inventors paid attention to the following. Generation of the non-linear waveform for updating the synaptic weight within the synapse circuit 710 in the conventional neural network circuit element 700 is attributed to the fact that the signal (will be referred to as another signal or another input signal) from another neural network circuit element, which is input to the synapse circuit 710, is the spike pulse (input pulse $x_1$ in FIG. 13). That is, in the conventional configuration, since another input signal is the spike pulse, there causes a need to generate the non-linear waveform in the synapse circuit 710 using another input signal as a trigger, to compare the spike pulse of the another input signal to the spike pulse (will be referred to as particular input signal) generated in the neural network circuit element 700 including the synapse circuit 710 to which another signal is input.

Accordingly, the present inventors found out that, by outputting the non-linear waveform as the output signal of the neural network circuit element, it becomes possible to eliminate a need to convert another input signal into the non-linear waveform after the synapse circuit in the neural network circuit element receives another input signal. In addition, the present inventors found out that, to effectively detect a difference in input timing when the non-linear waveforms are compared to each other, a bipolar sawtooth waveform (as will be described later) or a mexican-hat waveform (as will be described later) are suitably adopted as the non-linear waveforms.

Hereinafter, the learning method of the neural network circuit according to the embodiment of the present invention will be described with reference to the drawings.

Embodiment

Figure 1:
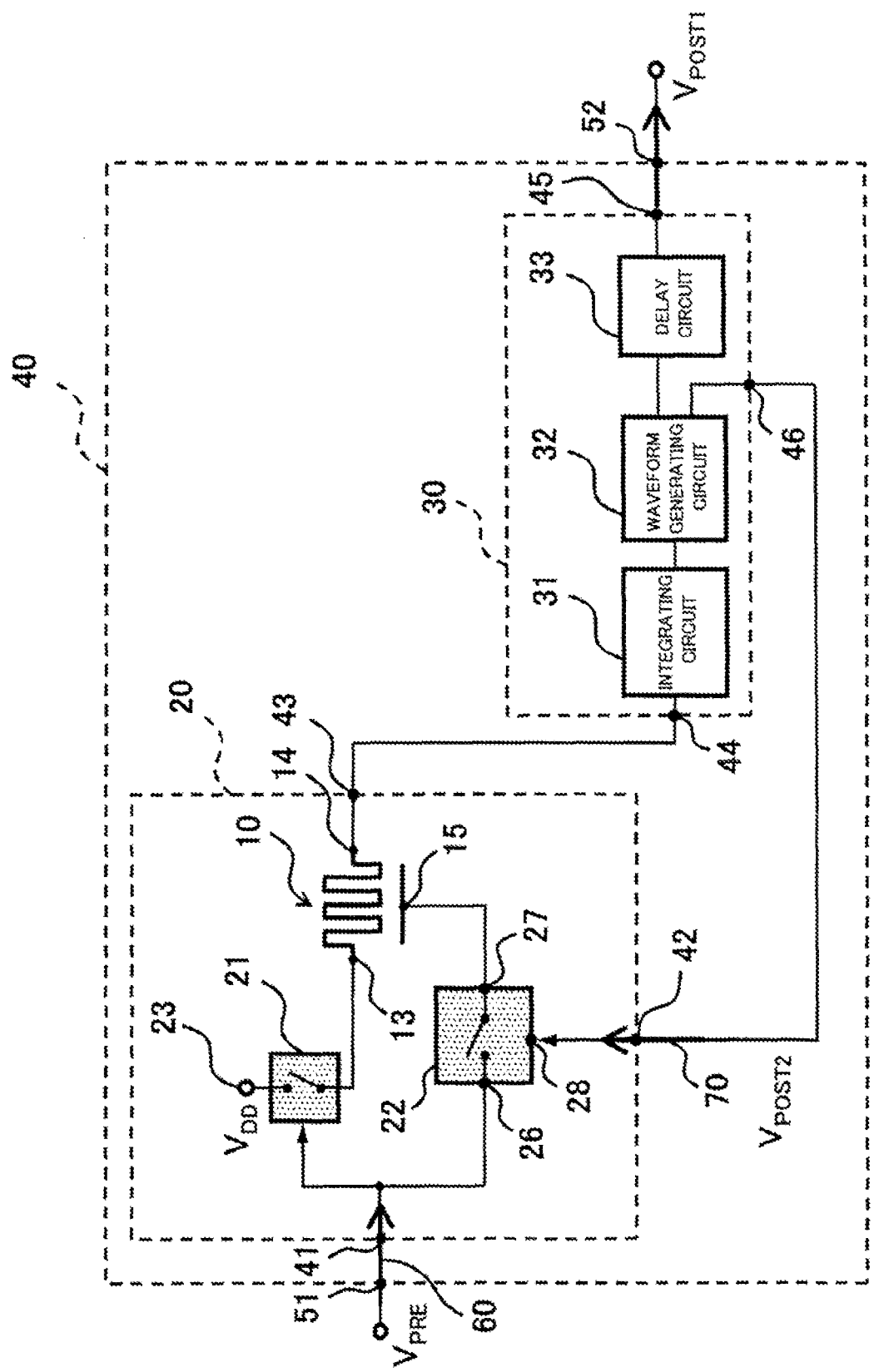
FIG. 1 is a block diagram showing a neural network circuit element according to an embodiment.

FIG. 1 is a block diagram showing a neural network circuit element 40 (hereinafter will be sometimes referred to as particular neural network circuit element) according to an embodiment. One neural network circuit element 40 includes at least one input terminal 51, a synapse circuit 20 which is equal in number to the input terminal 51, one neuron circuit 30, and one output terminal 52. As shown in FIGS. 11A and 11B, the neural network circuit is configured to include a plurality of neural network circuit elements 40 which are interconnected. Specifically, the output terminal 52 of the particular neural network circuit element 40 is connected to the input terminal 51 of other neural network circuits element 40.

The input terminal 51 of the neural network circuit element 40 is connected to a first input terminal 41 of the synapse circuit 20. An output terminal 43 of the synapse circuit 20 is connected to an input terminal 44 of the neuron circuit 30. A first output terminal 45 of the neuron circuit 30 is connected to the output terminal 52 of the neural network circuit element 40. For easier illustration, only one neuron circuit 30 and one synapse circuit 20 are shown in FIG. 1. However, actually, a plurality of synapse circuits 20 are connected to one neuron circuit 30.

The neuron circuit 30 includes an integrating circuit 31, a waveform generating circuit 32, and a delay circuit 33.

The input terminal 44 of the neuron circuit 30 is connected to the integrating circuit 31. The integrating circuit 31 computes a sum of currents flowing from the plurality of synapse circuits 20 connected to the neuron circuit 30. At a time when the computed value exceeds a predetermined value, the integrating circuit 31 outputs a signal (trigger signal) to the waveform generating circuit 32.

Upon inputting of the signal from the integrating circuit 31, as a trigger, the waveform generating circuit 32 generates a non-linear waveform pulse voltage $V_{POST1}$ and a switching pulse voltage $V_{POST2}$. The non-linear waveform pulse voltage $V_{POST1}$ has, for example, a shape of FIG. 2A or 2B, or a shape formed by inverting a sign of these shapes. The non-linear waveform pulse voltage of FIG. 2A will be referred to as "bipolar sawtooth pulse voltage". The bipolar sawtooth pulse voltage has a characteristic in which an electric potential which is initially 0V decreases to a predetermined negative electric potential with a passage of time, then rises to a predetermined positive electric potential, and then returns to 0V. By comparison, the non-linear waveform pulse voltage of FIG. 2B will be referred to as "mexican-hat pulse voltage". The mexican-hat pulse voltage has a characteristic in which an electric potential which is initially 0V decreases to a predetermined negative electric potential with a passage of time, then rises to a predetermined positive electric potential, then decreases to a predetermined negative electric potential, and then returns to 0V again. As the switching pulse voltage $V_{POST2}$, for example, a square wave pulse voltage of FIG. 2C may be used.

Figure 17:
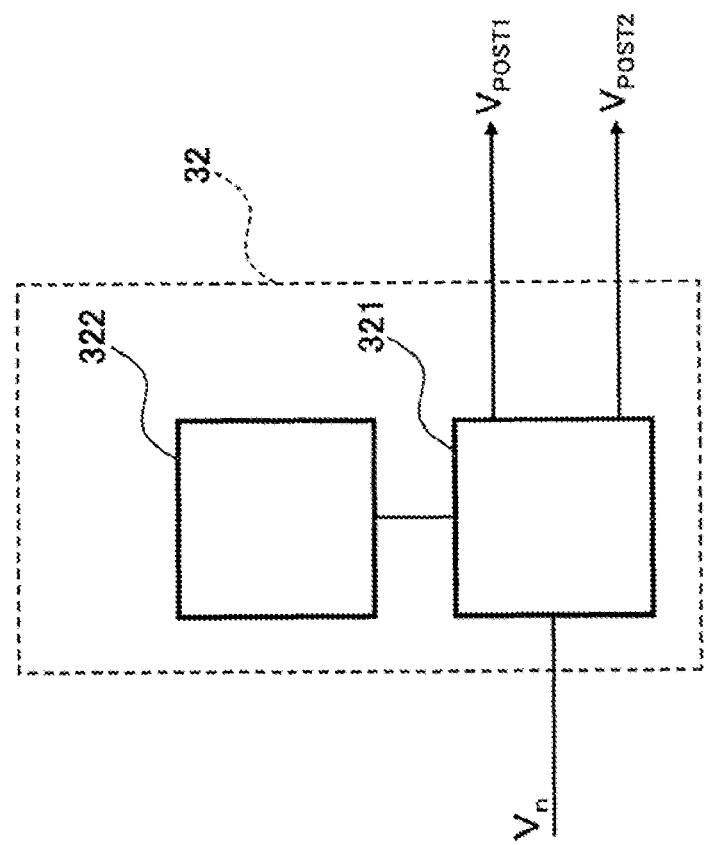
FIG. 17 is a view showing a signal generating circuit according to the embodiment.

As shown in FIG. 17, for example, the waveform generating circuit 32 includes a D/A converter 321 which is activated in response to the signal output from the integrating circuit 31 as a trigger, and a digital memory 322 for storing digital waveform data used to generate the bipolar sawtooth pulse voltage or the mexican-hat pulse voltage. Upon inputting of the signal output from the integrating circuit 31 to the D/A converter 321, the D/A converter 321 reads digital waveform data from the digital memory 322, and converts the digital waveform data into analog waveform data and outputs the analog waveform data.

The delay circuit 33 outputs the non-linear waveform pulse voltage $V_{POST1}$ to the first output terminal 45 of the neuron circuit 30 after a passage of predetermined delay time. The first output terminal 45 of the neuron circuit 30 is connected to the output terminal 52 of the neural network circuit element 40. Therefore, the signal output from the delay circuit 33 is the signal output from the neural network circuit element 40. This output signal is input as a first input signal voltage (i.e., non-linear waveform pulse voltage $V_{PRE}$) to the first input terminal of the synapse circuit in other neural network circuit elements (not shown). The switching pulse voltage $V_{POST2}$ is output to a second output terminal 46 of the neuron circuit 30. The second output terminal 46 is connected to all second input terminals 42 of synapse circuits 20 connected to the neuron circuit 30. The switching pulse voltage $V_{POST2}$ is input to the second input terminals 42 as a second input signal voltage 70.

The synapse circuit 20 includes a first switch 22, a second switch 21, a variable resistance element 10 as will be described later, and a specified DC voltage source 23. The first input terminal 41 of the synapse circuit 20 is connected to an input terminal 26 of the first switch 22. The second input terminal 42 of the synapse circuit 20 is connected to a control terminal 28 of the first switch 22.

An output terminal 27 of the first switch 22 is connected to a control electrode 15 of the variable resistance element 10. An output terminal 43 of the synapse circuit 20 is connected to a second electrode 14 of the variable resistance element 10. The output terminal 43 of the synapse circuit 20 is connected to the input terminal 44 of the neuron circuit 30. The first input signal voltage 60 input to the synapse circuit 20 is a non-linear waveform pulse voltage $V_{PRE}$ from another neural network circuit element (not shown). The second input signal voltage 70 input to the second input terminal 42 of the synapse circuit 20 is the switching pulse voltage $V_{POST2}$ generated in the waveform generating circuit 32 of the neuron circuit 30 within the particular neural network circuit element 40.

In the configuration of the neural network circuit element 40 of the present embodiment, it should be noted that the neuron circuit 30 generates all waveforms and the processing operation and the learning operation are performed using the generated non-linear waveform pulse voltage $V_{POST1}$ (this is the non-linear waveform pulse voltage $V_{PRE}$ to be input to other neural network circuit elements 40) and the generated switching pulse voltage $V_{POST2}$. This can simplify the configuration of the synapse circuit 20.

Figure 5A:
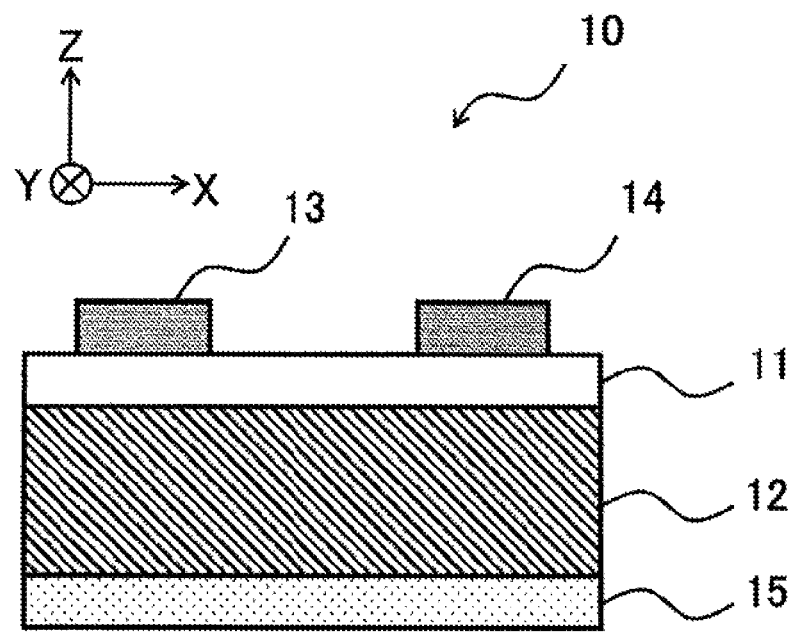
FIG. 5A is a cross-sectional view showing a variable resistance element according to the embodiment.
Figure 5B:
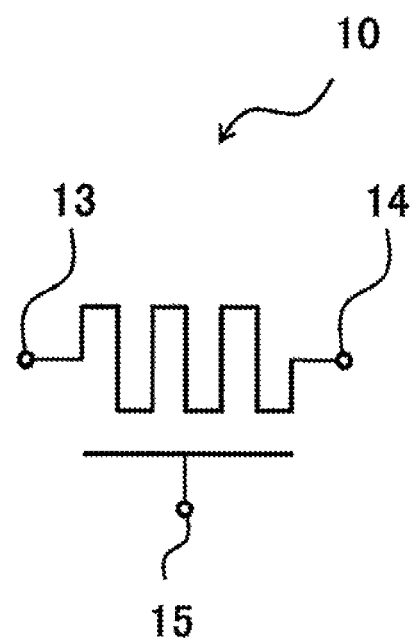
FIG. 5B is a view showing a circuit symbol of the variable resistance element according to the embodiment.

Next, the variable resistance element 10 will be described. FIGS. 5A and 5B show a cross-sectional schematic view and a circuit symbol of the variable resistance element 10, respectively. The variable resistance element 10 includes a semiconductive layer 11, a ferroelectric layer 12, the first electrode 13, the second electrode 14 and the control electrode 15. Z-axis indicates a normal direction of the ferroelectric layer 12. X-axis is perpendicular to the Z-axis. The circuit symbol of the variable resistance element 10 is represented as shown in FIG. 5B. FIG. 1 shows the neural network circuit element 40 incorporating the variable resistance element 10 according to the representation of FIG. 5B.

The semiconductive layer 11 comprises a material, for example, ZnO, GaN, or InGaZnO. The ferroelectric layer 12 comprises a material, for example, Pb (Zr, Ti) $O_3$, Sr(Bi, Ta)O, or $Bi_{12}TiO_{20}$. The first electrode 13, the second electrode 14, and the control electrode 15 are each composed of, for example, a laminate comprising a platinum layer and a titanium layer.

The semiconductive layer 11, the ferroelectric layer 12 and the control electrode 15 are stacked together along the Z-axis. The first electrode 13 and the second electrode 14 are placed on an obverse surface of the semiconductive layer 11.

Next, the variable resistance value of the variable resistance element 10 will be described with reference to FIG. 5A. The variable resistance value of the variable resistance element 10 refers to the resistance value between the first electrode 13 and the second electrode 14. In a case where a portion of the ferroelectric layer 12 has an upward polarization direction, a portion of the semiconductive layer 11 stacked on and above the portion of the ferroelectric layer 12 has a lower resistance. On the other hand, in a case where a portion of the ferroelectric layer 12 has a downward polarization direction, a portion of the semiconductive layer 11 stacked on and above the portion of the ferroelectric layer 12 has a higher resistance. In this case, the resistance value between the first electrode 13 and the second electrode 14 is a resistance value of a region of semiconductor which region is sandwiched between the first electrode 13 and the second electrode 14. Therefore, depending on the ratio between the region having the upward polarization direction and the region having the downward polarization direction in the ferroelectric layer 12, which is located under the region, the resistance value between the first electrode 13 and the second electrode 14 changes continuously.

Next, a control method of the resistance value of the variable resistance element 10 according to the present embodiment will be described with reference to FIG. 5A. In the variable resistance element 10, by providing an electric potential difference between the first electrode 13 and the second electrode 14, and the control electrode 15, the polarization direction of the ferroelectric layer 12 is changed, and thus, the resistance value between the first electrode 13 and the second electrode 14 is controlled. For example, if a positive electric potential difference is provided between the first electrode 13 and the second electrode 14, and the control electrode 15, on the basis of the first electrode 13 and the second electrode 14, a direction of an electric field caused by the polarization of the ferroelectric layer 12 is easily made upward (toward the semiconductive layer 11). On the other hand, if a negative electric potential difference is provided between the first electrode 13 and the second electrode 14, and the control electrode 15, on the basis of the first electrode 13 and the second electrode 14, the direction of the electric field caused by the polarization of the ferroelectric layer 12 is easily made downward (toward the control electrode 15). As an absolute value of the electric potential difference increases, a change amount of the polarization of the ferroelectric layer 12 due to the electric potential difference increases. Therefore, if the positive electric potential difference is provided, the resistance value between the first electrode 13 and the second electrode 14 decreases, while if the negative electric potential difference is provided, the resistance value between the first electrode 13 and the second electrode 14 increases. The resistance value changes more greatly as the absolute value of the electric potential difference increases. The term "upward" is at a side where semiconductive layer 11 is located, while the term "downward" is at a side where the control electrode 15 is located.

Next, a detailed operation of the neural network circuit element 40 will be described.

Firstly, the processing operation of the neural network circuit element 40 will be described.

During the "processing" operation, in response to the second input signal voltage 70 of the synapse circuit 20, the first switch 22 maintains a state in which the control electrode 15 of the variable resistance element 10 is electrically disconnected from the first input terminal 41 of the synapse circuit 20.

While the non-linear waveform pulse voltage $V_{PRE}$ which is the first input signal is input to the synapse circuit 20, the second switch 21 connects the DC voltage source (first reference voltage source) 23 for supplying a predetermined first reference voltage (power supply voltage $V_{DD}$) to the first electrode 13 of the variable resistance element 10. That is, when the non-linear waveform pulse voltage $V_{PRE}$ from another neural network circuit element (not shown) is input to the synapse circuit 20 as the first input signal voltage 60, the second switch 21 is opened or closed in response to the non-linear waveform pulse voltage $V_{PRE}$. For example, the second switch 21 is closed for a period during which the non-linear waveform pulse voltage $V_{PRE}$ is HI level which is equal to or greater than a predetermined voltage, and is opened for a period other than the period during which the non-linear waveform pulse voltage $V_{PRE}$ is HI level. The second electrode 14 of the synapse circuit 20 is equal in electric potential to a ground voltage (second reference voltage supplied from a second reference voltage source and being different from the first reference voltage).

When the second switch 21 is closed, the DC voltage source (first reference voltage source) 23 is connected to the first electrode 13 of the variable resistance element 10. As described above, the variable resistance element 10 has a characteristic in which the resistance value between the first electrode 13 and the second electrode 14 changes. In the state in which the second switch 21 is closed, the power supply voltage $V_{DD}$ is applied between the first electrode 13 and the second electrode 14 in the variable resistance element 10, and a current which is proportional to a conductance (inverse number of resistance value) of the variable resistance element 10 at a present time flows from the DC voltage source 23 to the second electrode 14 of the variable resistance element 10 and is input to the neuron circuit 30. A magnitude of the current input to the neuron circuit 30 is proportional to the synaptic weight w and represents the PSP ($P_1(t)$, $P_2(t)$) of FIG. 13. This means that the conductance (inverse number of resistance value) of the variable resistance element 10 corresponds to the synaptic weight w in the present embodiment.

The signals from other plural neural network circuit elements are input asynchronously to the neuron circuit 30 via the plurality of synapse circuits 20. Input currents from the plurality of synapse circuits 20 are summed up in a spatiotemporal manner in the integrating circuit 31 of the neuron circuit 30. An integrated voltage generated by the spatiotemporal summation may be assumed as the internal electric potential $V_n$. When the internal electric potential $V_n$ exceeds a threshold voltage $V_{TH}$, the waveform generating circuit 32 generates the pulse voltages ($V_{POST1}$, $V_{POST2}$). The non-linear waveform pulse voltage $V_{POST1}$ generated in the waveform generating circuit 32 is applied as the first input signal voltage $V_{PRE}$ to the first input terminals of the synapse circuits in other neural network circuit elements (not shown) after a passage of predetermined delay time set by the delay circuit 33. This delay time corresponds to transmission delay time $t_{Delay}$ in a neuron model.

Next, the learning operation, especially, the learning operation utilizing the STDP will be described.

In the "learning" operation, the waveform generating circuit 32 of the neuron circuit 30 generates the non-linear waveform pulse voltage $V_{POST1}$ and the switching pulse voltage $V_{POST2}$ simultaneously. The waveform generating circuit 32 outputs the pulse voltages such that time $T_{in}$ indicated by one-dotted line in FIG. 2A, time $T_{in}$ indicated by one-dotted line in FIG. 2B, and time $T_{in}$ indicated by one-dotted line in FIG. 2C are the same time. The switching pulse voltage $V_{POST2}$ is applied as the second input signal voltage 70 to the control terminal 28 of the first switch 22 of the synapse circuit 20. The non-linear waveform pulse voltage $V_{PRE}$ from another neural network circuit element (not shown) is input as the first input signal voltage 60 to the input terminal 26 of the first switch 22 of the synapse circuit 20. In the synapse circuit 20, the first switch 22 is switched in response to the switching pulse voltage $V_{POST2}$. The switching pulse voltage $V_{POST2}$ has a predetermined level (HI level) for a period having a predetermined duration before and after a temporal mid point of the non-linear waveform pulse voltage $V_{PRE}$ generated within the particular neural network circuit element 40.

Next, a description will be given of a method of implementing the STDP in the synapse circuit 20 including the variable resistance element 10 with reference to FIG. 1. For example, it is assumed that for a period during which the switching pulse voltage $V_{POST2}$ is HI level, the control electrode 15 of the variable resistance element 10 is connected to the first input terminal 41 of the synapse circuit 20 via the first switch 22. For a period during which the switching pulse voltage $V_{POST2}$ is HI level, the first input signal voltage $V_{PRE}$ is permitted to be input to the control electrode 15 of the variable resistance element 10. In this case, when the non-linear waveform pulse voltage $V_{PRE}$ is input to the first input terminal 41, in the state in which the first switch 22 electrically connects the control electrode 15 of the variable resistance element 10 and the first input terminal 41 to each other in response to the switching pulse voltage $V_{POST2}$ being HI level, a pulse voltage is applied to the control electrode 15 of the variable resistance element 10 for a period during which the switching pulse voltage $V_{POST2}$ is HI level and the non-linear waveform pulse voltage $V_{PRE}$ is applied. Thus, since the switching pulse voltage $V_{POST2}$ and the non-linear waveform pulse voltage $V_{PRE}$ are input such that the switching pulse voltage $V_{POST2}$ overlaps with the non-linear waveform pulse voltage $V_{PRE}$ in time, a finite voltage is applied to the control electrode 15 of the variable resistance element 10.

Since an electric potential difference is provided between the first electrode 13 and the second electrode 14, and the control electrode 15, the resistance value of the variable resistance element 10 changes because of this electric potential difference. As described above, in the present embodiment, since the inverse number of resistance value (conductance) of the variable resistance element 10 corresponds to the synaptic weight w, it becomes possible to perform the "learning" operation for updating the synaptic weight w of the synapse circuit 20 according to the change in the resistance value.

Depending on the timing at which the non-linear waveform pulse voltage $V_{PRE}$ is applied, and the timing at which the switching pulse voltage $V_{POST2}$ is applied, a waveform of the pulse voltage applied to the control electrode 15 of the variable resistance element 10 changes. As described above, the degree to which the resistance value of the variable resistance element 10 changes depends on a magnitude of the voltage applied thereto, i.e., voltage waveform. Therefore, the degree to which the resistance value of the variable resistance element 10 changes, also varies depending on the shapes of the generated waveforms which are changeable depending on the timings at which the two pulse voltages are applied. In the present embodiment, by using the bipolar sawtooth pulse voltage of FIG. 2A as the non-linear waveform pulse voltages, the non-symmetric STDP of FIG. 14B can be implemented. Also, by using the mexican-hat pulse voltage of FIG. 2B as the non-linear waveform pulse voltages, the symmetric STDP of FIG. 14C can be implemented.

Figure 2A:
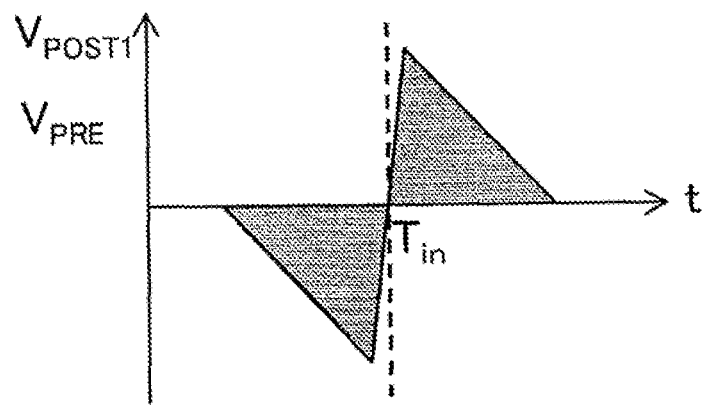
FIG. 2A is a view showing a shape of a bipolar sawtooth pulse voltage used as a first input signal voltage according to the embodiment.
Figure 2B:
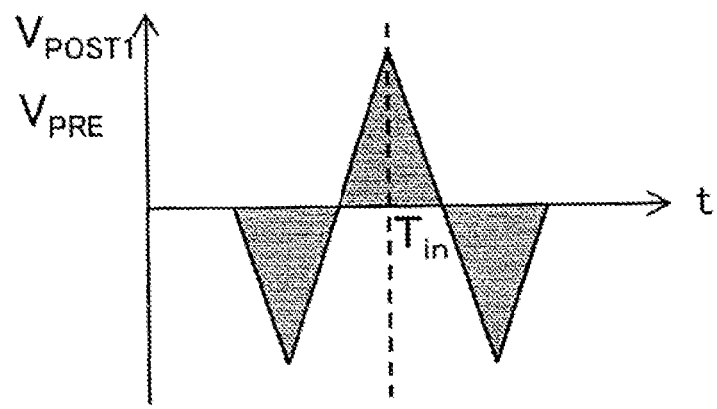
FIG. 2B is a view showing a shape of a mexican-hat pulse voltage used as the first input signal voltage according to the embodiment.
Figure 2C:
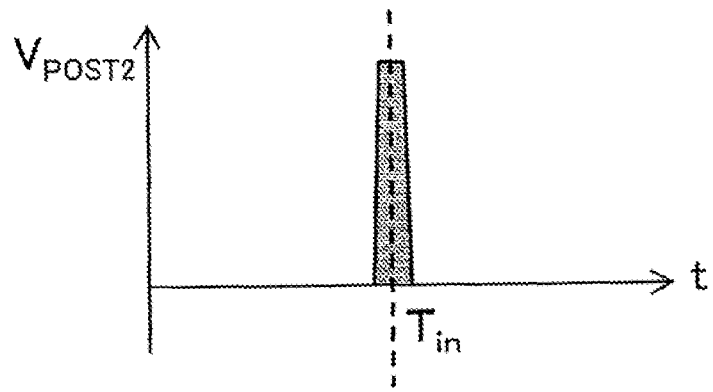
FIG. 2C is a view showing a shape of a square wave pulse voltage used as a second input signal voltage according to the embodiment.
Figure 3:
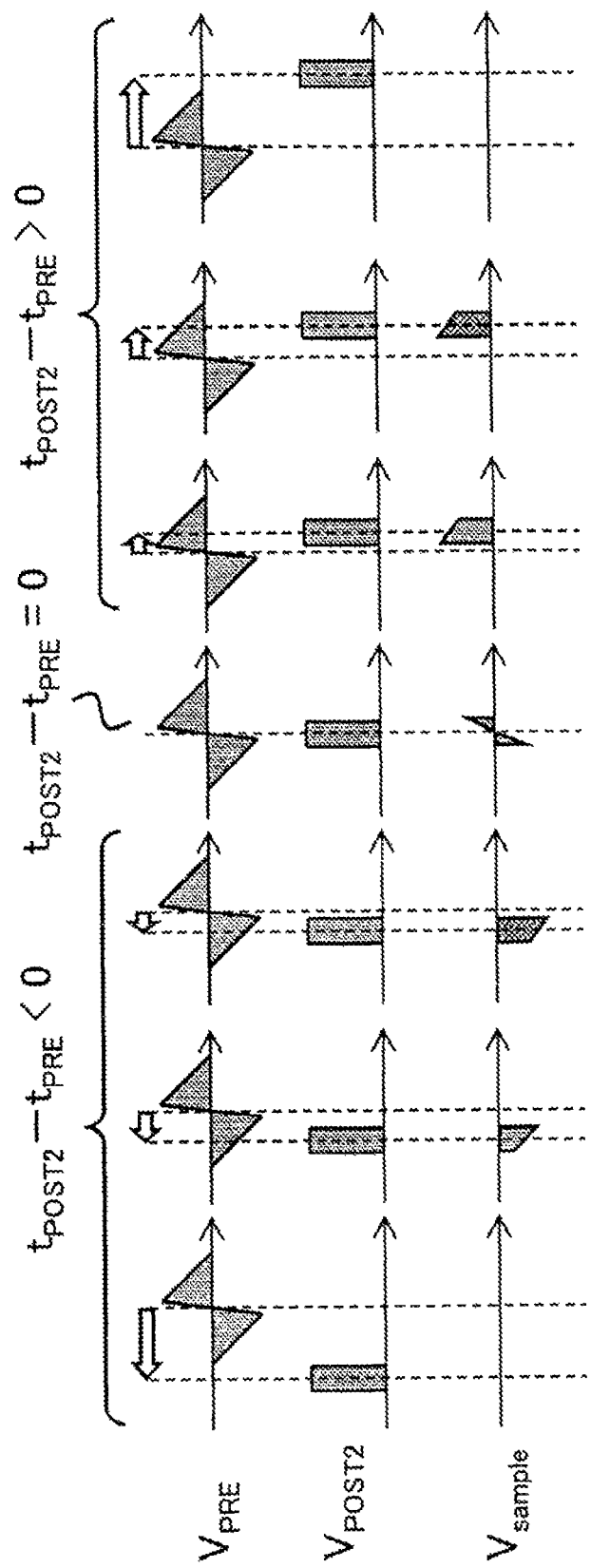
FIG. 3 is a view showing an operation of a first switch, for switching between continuity and non-continuity of a bipolar sawtooth pulse voltage $V_{PRE}$ of FIG. 2A, in response to the square wave pulse voltage $V_{POST2}$ of FIG. 2C.

FIG. 3 schematically shows the operation of the first switch 22 in a case where the bipolar sawtooth pulse voltage of FIG. 2A is used as the non-linear waveform pulse voltages $V_{PRE}$ and the square wave pulse voltage of FIG. 2C is used as the switching pulse voltage $V_{POST2}$. It is assumed that only for a period during which the switching pulse voltage $V_{POST2}$ is HI level, the non-linear waveform pulse voltage $V_{PRE}$ is applied to the control electrode 15 of the variable resistance element 10. A voltage applied to the control electrode 15 by the operation of the first switch 22 is expressed as $V_{sample}$. As an input timing difference ($t_{POST2}-t_{PRE}$) between the non-linear waveform pulse voltage $V_{PRE}$ and the switching pulse voltage $V_{POST2}$ changes, a waveform of $V_{sample}$ changes, too. For example, when the non-linear waveform pulse voltage $V_{PRE}$ and the switching pulse voltage $V_{POST2}$ overlap with each other in time, in a case where $t_{POST2}-t_{PRE}<0$ (the non-linear waveform pulse voltage $V_{PRE}$ is input earlier than the switching pulse voltage $V_{POST2}$), a negative electric potential difference change in $V_{sample}$ increases. As a negative electric potential difference provided between the first electrode 13 and the second electrode 14, and the control electrode 15 in the variable resistance element 10 increases, the conductance (inverse number of resistance value) of the variable resistance element 10 decreases greatly. Therefore, as the negative change in $V_{sample}$ increases, the conductance (inverse number of resistance value) of the variable resistance element 10 decreases greatly. On the other hand, when the non-linear waveform pulse voltage $V_{PRE}$ and the switching pulse voltage $V_{POST2}$ overlap with each other in time, in a case where $t_{POST2}-t_{PRE}>0$ (the non-linear waveform pulse voltage $V_{PRE}$ is input later than the switching pulse voltage $V_{POST2}$), a positive electric potential difference change in $V_{sample}$ increases. As a positive electric potential difference provided between the first electrode 13 and the second electrode 14, and the control electrode 15 increases, the conductance (inverse number of resistance value) increases greatly. Therefore, when the positive change in $V_{sample}$ increases, the conductance (inverse number of resistance value) of the variable resistance element 10 increases greatly.

Figure 4:
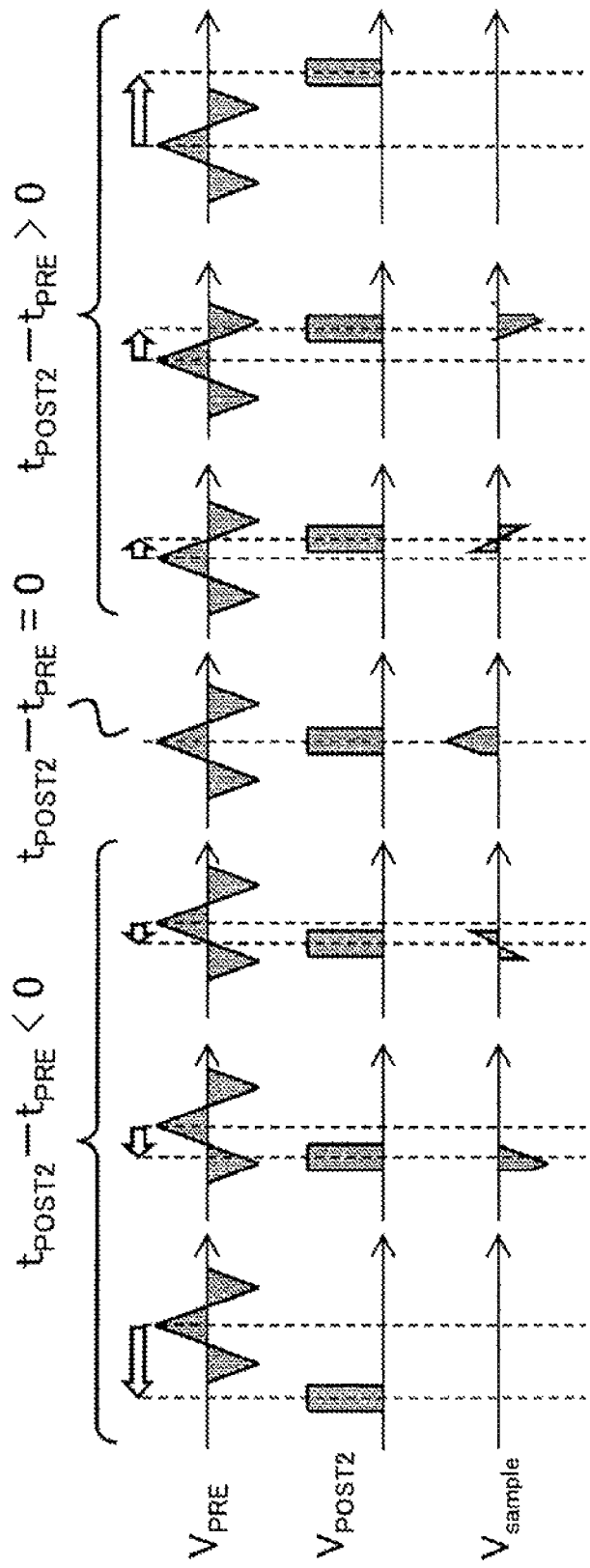
FIG. 4 is a view showing an operation of the first switch, for switching between continuity and non-continuity of the mexican-hat pulse voltage $V_{PRE}$ of FIG. 2B, in response to the square wave pulse voltage $V_{POST2}$ of FIG. 2C.

FIG. 4 schematically shows the operation of the first switch 22 in a case where the mexican-hat pulse voltage of FIG. 2B is used as the non-linear waveform pulse voltage $V_{PRE}$, and the square wave pulse voltage of FIG. 2C is used as the switching pulse voltage $V_{POST2}$. It is assumed that only for a period during which the switching pulse voltage $V_{POST2}$ is HI level (i.e., period for which the first input signal voltage $V_{PRE}$ is permitted to be input to the control electrode 15 of the variable resistance element 10), the non-linear waveform pulse voltage $V_{PRE}$ is applied to the control electrode 15 of the variable resistance element 10. As an input timing difference ($t_{POST2}-t_{PRE}$) between the non-linear waveform pulse voltage $V_{PRE}$ and the switching pulse voltage $V_{POST2}$ changes, a waveform of $V_{sample}$ changes, too. For example, when the switching pulse voltage $V_{POST2}$ is applied at a timing when the electric potential of the non-linear waveform pulse voltage $V_{PRE}$ has a positive value, the positive electric potential difference change in $V_{sample}$ increases. As the positive electric potential difference provided between the first electrode 13 and the second electrode 14, and the control electrode 15 in the variable resistance element 10 increases, the conductance (inverse number of resistance value) of the variable resistance element 10 increases greatly. Therefore, as the positive change in $V_{sample}$ increases, the conductance (inverse number of resistance value) of the variable resistance element 10 increases greatly. On the other hand, when the switching pulse voltage $V_{POST2}$ is applied at a timing when the electric potential of the non-linear waveform pulse voltage $V_{PRE}$ has a negative value, the negative electric potential difference change in $V_{sample}$ increases. As the negative electric potential difference provided between the first electrode 13 and the second electrode 14, and the control electrode 15 in the variable resistance element 10 increases, the conductance (inverse number of resistance value) of the variable resistance element 10 decreases greatly. Therefore, as the negative change in $V_{sample}$ increases, the conductance (inverse number of resistance value) of the variable resistance element 10 decreases greatly.

As described above, by switching the first switch 22 using the switching pulse voltage $V_{POST2}$, the electric potential difference, corresponding to the input timing difference between the switching pulse voltage $V_{POST2}$ (second input signal voltage) generated in the particular neural network circuit element 40 and the non-linear waveform pulse voltage (first input signal voltage) $V_{PRE}$ input from another neural network circuit element, is provided between the first electrode 13 and the second electrode 14, and the control electrode 15 in the variable resistance element 10. Because of the electric potential difference provided in this way, the change in the resistance value which depends on the input timing difference in the variable resistance element 10 is implemented.

As described above, since the non-linear waveform pulse voltage $V_{PRE}$ which is the bipolar sawtooth pulse voltage or the mexican-hat pulse voltage input from another neural network circuit element is compared to the switching pulse voltage $V_{POST2}$ corresponding to the timing of generation of the bipolar sawtooth pulse voltage $V_{POST1}$ generated in the neuron circuit 30 within the particular neural network circuit element 40, there is no need to generate the waveform used for comparison in the synapse circuit 20 in the particular neural network circuit element 40, which can reduce an area of the synapse circuit 20. Thus, a circuit area of the neural network circuit element 40 itself can be reduced. Therefore, it becomes possible to implement the learning operation based on the pulse timings with a configuration in which elements are less in number.

In addition, the bipolar sawtooth pulse voltage waveform which is bipolar and symmetric with respect to a point of 0V, or the mexican-hat pulse voltage waveform which is line-symmetric with respect to a time of 0V, is used as the non-linear waveform pulse voltage $V_{PRE}$ which is a compared target. Therefore, a timing difference between the first input signal voltage $V_{PRE}$ and the switching pulse voltage $V_{POST2}$ which is the second input signal voltage to be compared to the first input signal voltage $V_{PRE}$ can be easily reflected on the change in the resistance value of the variable resistance element 10.

The waveforms of the non-linear waveform pulse voltages $V_{PRE}$ and $V_{POST1}$ are not particularly limited so long as they are the above bipolar sawtooth pulse voltage waveform or the mexican-hat pulse voltage waveform. For example, in the case of the bipolar sawtooth pulse voltage, as shown in FIG. 2A, a waveform in which a slope of a line segment connecting an apex of each polarity to a point of 0V is steeper than a slope of another portion may be used. Since the slope in a region closer to the point of 0V is steeper, the change in the electric potential difference $V_{sample}$ increases even when there is a little input timing difference between the first input signal voltage $V_{PRE}$ and the second input signal voltage $V_{POST2}$. Therefore, sensitivity to the input timing difference can be enhanced. Likewise, in the case of the mexican-hat pulse voltage, as shown in FIG. 2B, since a slope of a line segment connecting apexes of polarities is steep, the change in the electric potential difference $V_{sample}$ increases even when there is a little input timing difference between the first input signal voltage $V_{PRE}$ and the second input signal voltage $V_{POST2}$.

Although in the present embodiment, the second switch 21 of the synapse circuit 20 is opened and closed using the non-linear waveform pulse voltage $V_{PRE}$, it may be opened and closed using, for example, a square wave pulse voltage which becomes a predetermined voltage for a time period during which the non-linear waveform pulse voltage $V_{PRE}$ is input.

EXAMPLE

Hereinafter, the present invention will be described in detail in conjunction with the examples below.

Example 1

Fabrication of Variable Resistance Element 10

An oxide conductive layer comprising a strontium ruthenium oxide ($SrRuO_3$) which was 30 nm in thickness was deposited on a (001) single crystal substrate comprising a strontium titanate ($SrTiO_3$) by pulse laser deposition (hereinafter will be referred to as PLD). A temperature of the substrate during deposition was 700 degrees C. After the deposition, the control electrode 15 was formed by photolithography and ion trimming.

In a state in which the temperature of the substrate was 700 degrees C., the ferroelectric layer 12 comprising lead zirconate titanate (PZT) (Pb (Zr, Ti) $O_3$) which was 450 nm in thickness was deposited on the SRO by the PLD. After that, the temperature of the substrate was lowered to 400 degrees C. Then, the semiconductive layer 11 comprising zinc oxide (ZnO) which was 30 nm in thickness was deposited on the ferroelectric layer 12.

After forming a patterned resist on the semiconductive layer 11, a laminate comprising a titanium layer with a thickness of 5 nm and a platinum layer with a thickness of 30 nm was deposited by electronic beam evaporation under a room temperature. After the deposition, the first electrode 13 and the second electrode 14 were formed by lift-off. In this way, the variable resistance element 10 was fabricated.

[Evaluation of Synapse Circuit]

Figure 6:
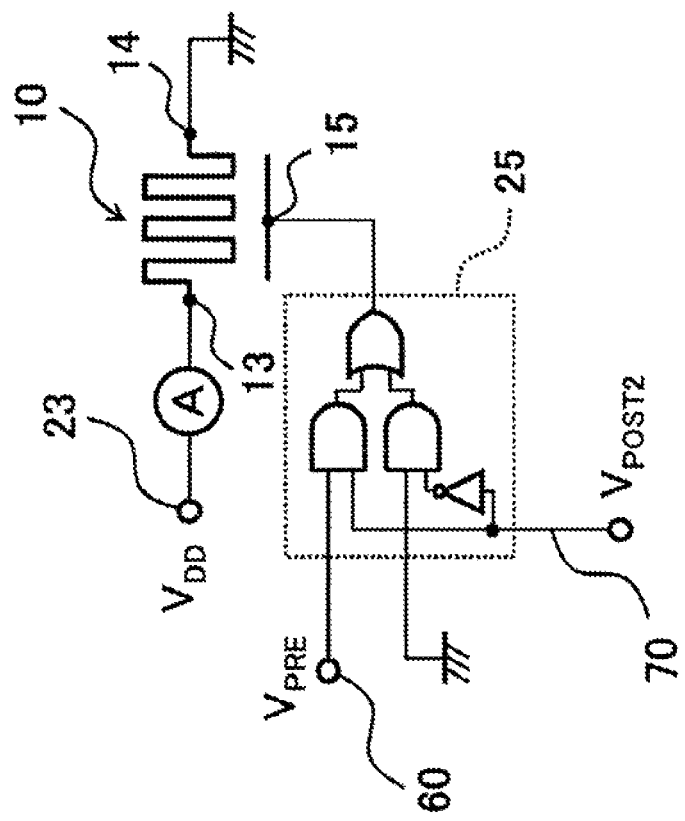
FIG. 6 is a view showing an evaluation circuit of STDP in Example.

A synapse circuit of FIG. 6 was configured, and the STDP characteristic of the synapse circuit incorporating the above stated variable resistance element 10 was evaluated. A DC voltage source of 0.1V was connected to $V_{DD}$. As the first switch, a switch circuit 25 of FIG. 6 was used. The switch circuit 25 operated so that the non-linear waveform pulse voltage $V_{PRE}$ was applied to the control electrode 15 of the variable resistance element 10 only for a period during which the switching pulse voltage $V_{POST2}$ was HI level, and the control electrode 15 of the variable resistance element 10 was grounded for a period other than the period during which the switching pulse voltage $V_{POST2}$ was HI level. In FIG. 6, the configuration of the second switch 21 of FIG. 1 is omitted.

Figure 7A:
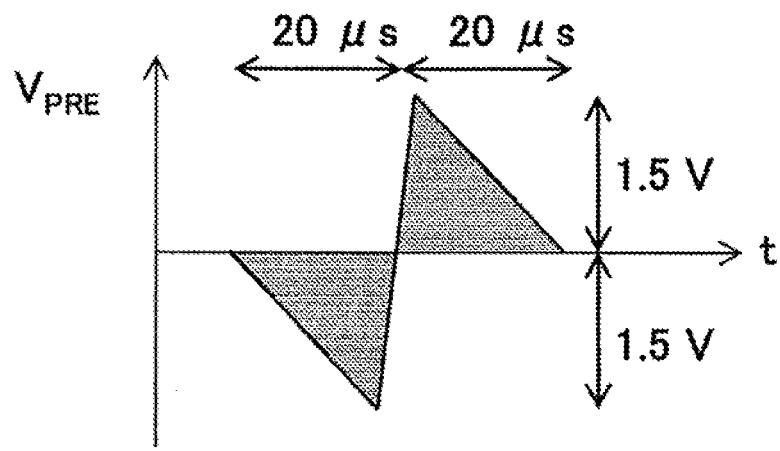
FIG. 7A is a view showing a shape of a bipolar sawtooth pulse voltage used as the first input signal voltage in Example 1.
Figure 7B:
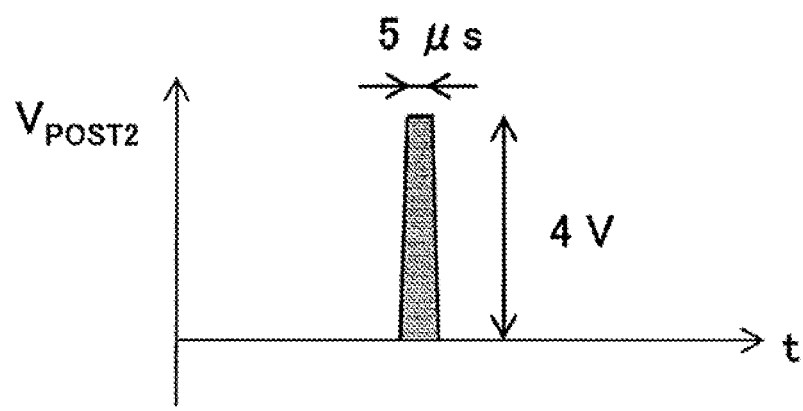
FIG. 7B is a view showing a shape of a square wave pulse voltage used as the second input signal voltage in Example 1.
Figure 7C:
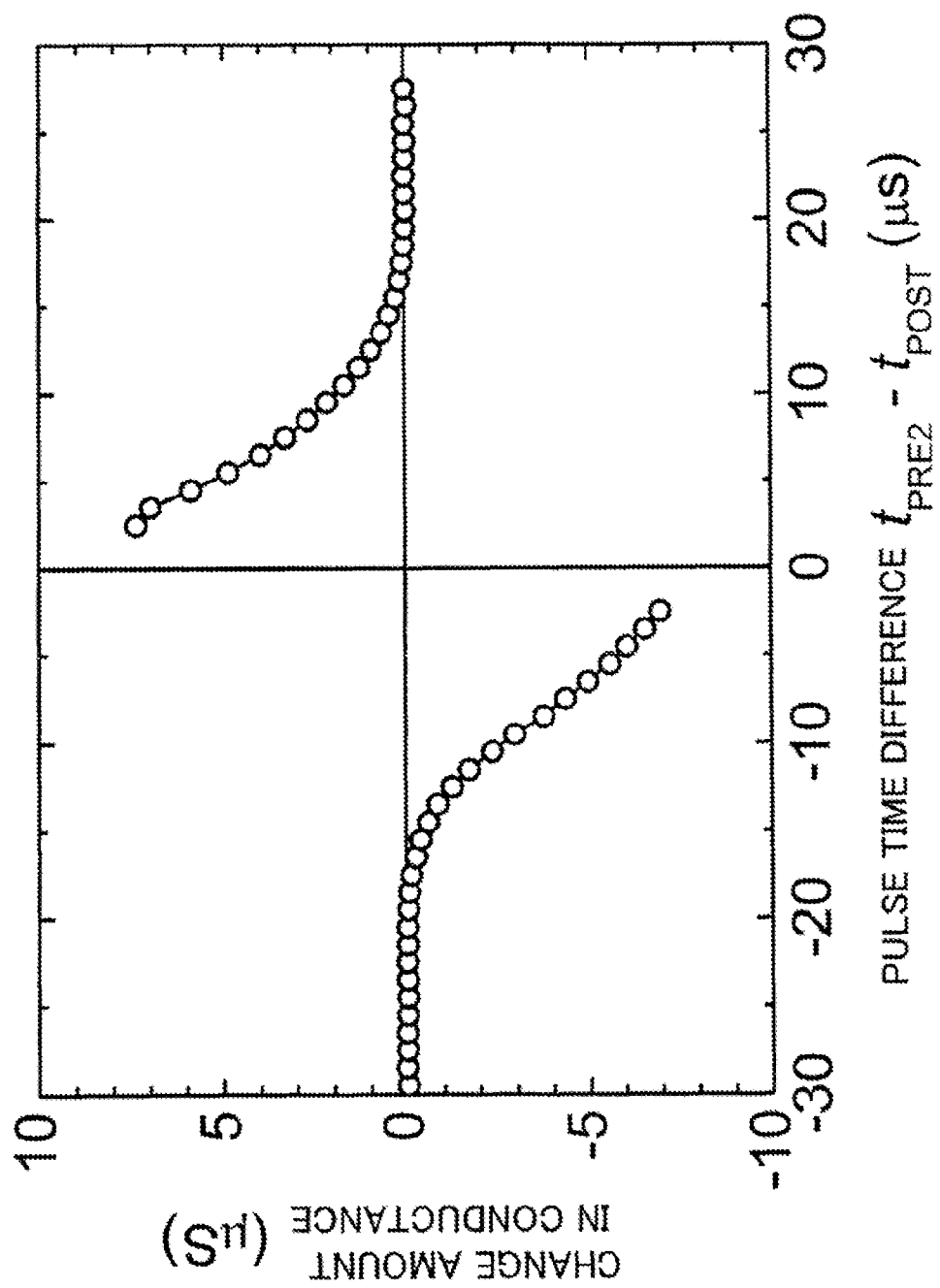
FIG. 7C is a view showing non-symmetric STDP in Example 1.

In the present example, a waveform of FIG. 7A was used as the non-linear waveform pulse voltage $V_{PRE}$, a waveform of FIG. 7B was used as the switching pulse voltage $V_{POST2}$, and the switch circuit 25 was used as the first switch 22 of FIG. 1. In this configuration, the switching operation of FIG. 3 was implemented. A change in the conductance (inverse number of resistance value) of the variable resistance element 10 before and after the non-linear waveform pulse voltage $V_{PRE}$ and the switching pulse voltage $V_{POST2}$ were applied was measured while changing the timings of application of the non-linear waveform pulse voltage $V_{PRE}$ and the switching pulse voltage $V_{POST2}$. As a result, as shown in FIG. 7C, the non-symmetric STDP of FIG. 14B was obtained.

(Evaluation of Integral Action)

Figure 8:
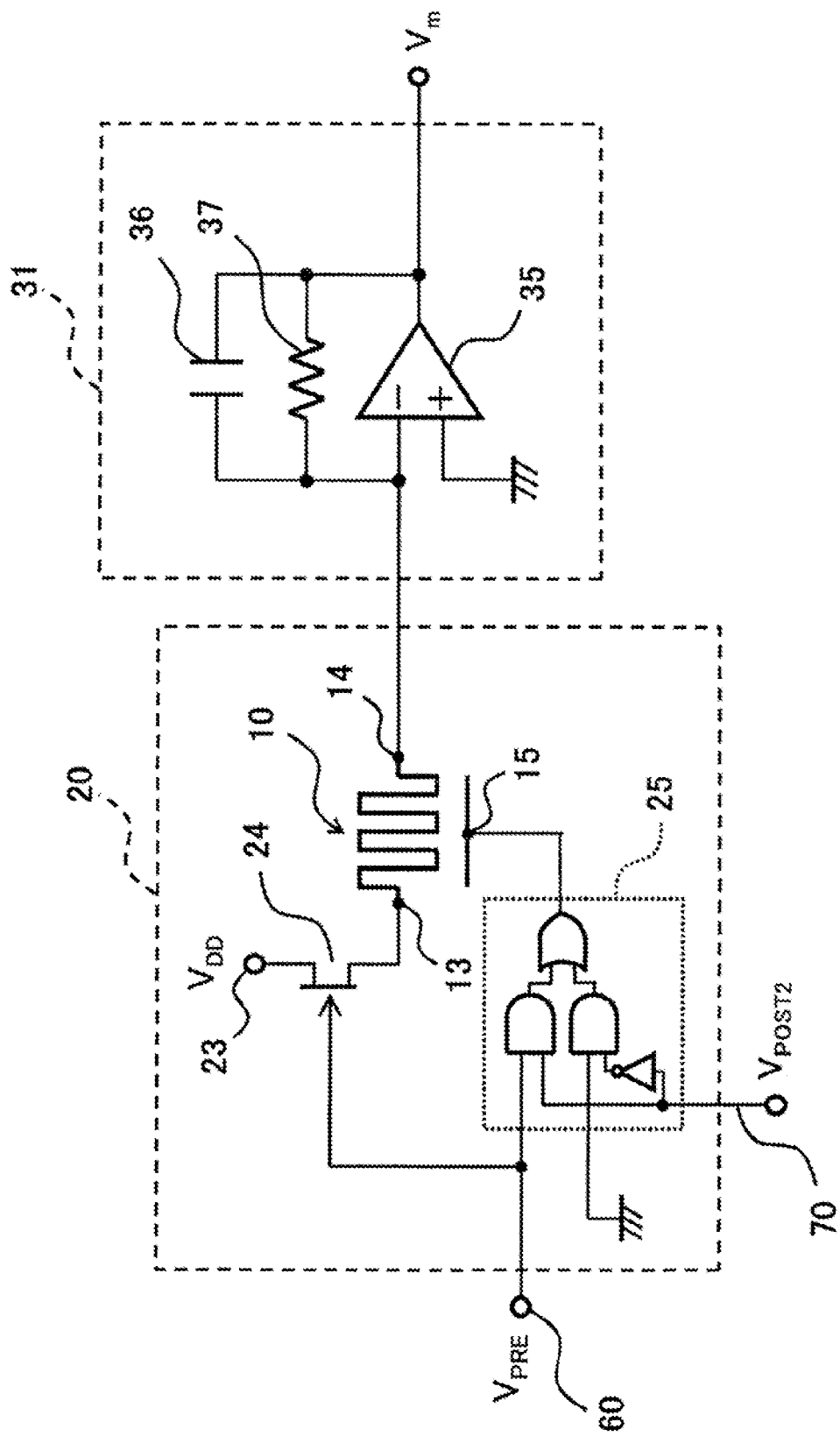
FIG. 8 is a view showing a circuit used in evaluation of an integral action in Example 1.

Next, a circuit in which the integrating circuit 31 was connected to one synapse circuit 20, as shown in FIG. 8, was fabricated. Using this circuit, the change in the integral action which was caused by the change in the resistance value of the variable resistance element 10, due to the STDP, was evaluated.

The integrating circuit 31 included an operational amplifier 35, a capacitor 36, and a resistor (resistive element) 37. A capacitance value of the capacitor 36 was 1 picofarad. The resistance value of the resistor 37 was 1 megohm. The integrating circuit 31 charged the capacitor 36 with a current input from the synapse circuit 20. By this operation, a result of temporal integration of the current was output as an integrated electric potential $V_n$. The capacitor 36 was placed between a negative input terminal (−) and an output terminal of the operational amplifier 35. A signal output from the operational amplifier 35 returned to the negative input terminal (−) via the resistor 37. As a result, by a feedback function of the operational amplifier 35, an input to the negative input terminal (−) was virtually grounded.

Since the input to the negative input terminal (−) of the operational amplifier 35 was virtually grounded, a constant current determined by a predetermined power supply voltage and the resistance value of the variable resistance element 10 was input to the neuron circuit 30 via the synapse circuit 20 regardless of the number of the synapse circuits 20 or the integrated electric potential of the capacitor 36.

As the first switch 22 of the synapse circuit 20 of FIG. 8, the circuit 25 similar to that of FIG. 6 was used. As the second switch 21 of the synapse circuit 20 of FIG. 8, a field effect transistor 24 was used. The non-linear waveform pulse voltage $V_{PRE}$ was applied to a gate terminal of the field effect transistor 24. The field effect transistor 24 used in the present example was turned ON for a period during which the non-linear waveform pulse voltage $V_{PRE}$ was HI level and turned OFF for a period other than the period during which the non-linear waveform pulse voltage $V_{PRE}$ was HI level. Since ON-resistance value of the field effect transistor 24 was equal to or less than $\frac{1}{100}$ of the resistance value of the variable resistance element 10, a resistance value between the DC voltage source 23 and the negative input terminal (−) of the operational amplifier 35 was almost equal to the resistance value of the variable resistance element 10. Therefore, a pulse current flowed through the variable resistance element 10 only for a period during which the non-linear waveform pulse voltage $V_{PRE}$ was HI level. A magnitude of the pulse current was approximately proportional to the inverse number of the resistance value (conductance) of the variable resistance element 10.

The current pulse input to the neuron circuit 30 charged into the capacitor 36 of the integrating circuit 31, so that a result of the temporal integration was output as $V_n$. The non-linear waveform pulse voltage $V_{PRE}$ was applied for 20 microseconds, and then the integrated voltage $V_n$ was evaluated.

Figure 9:
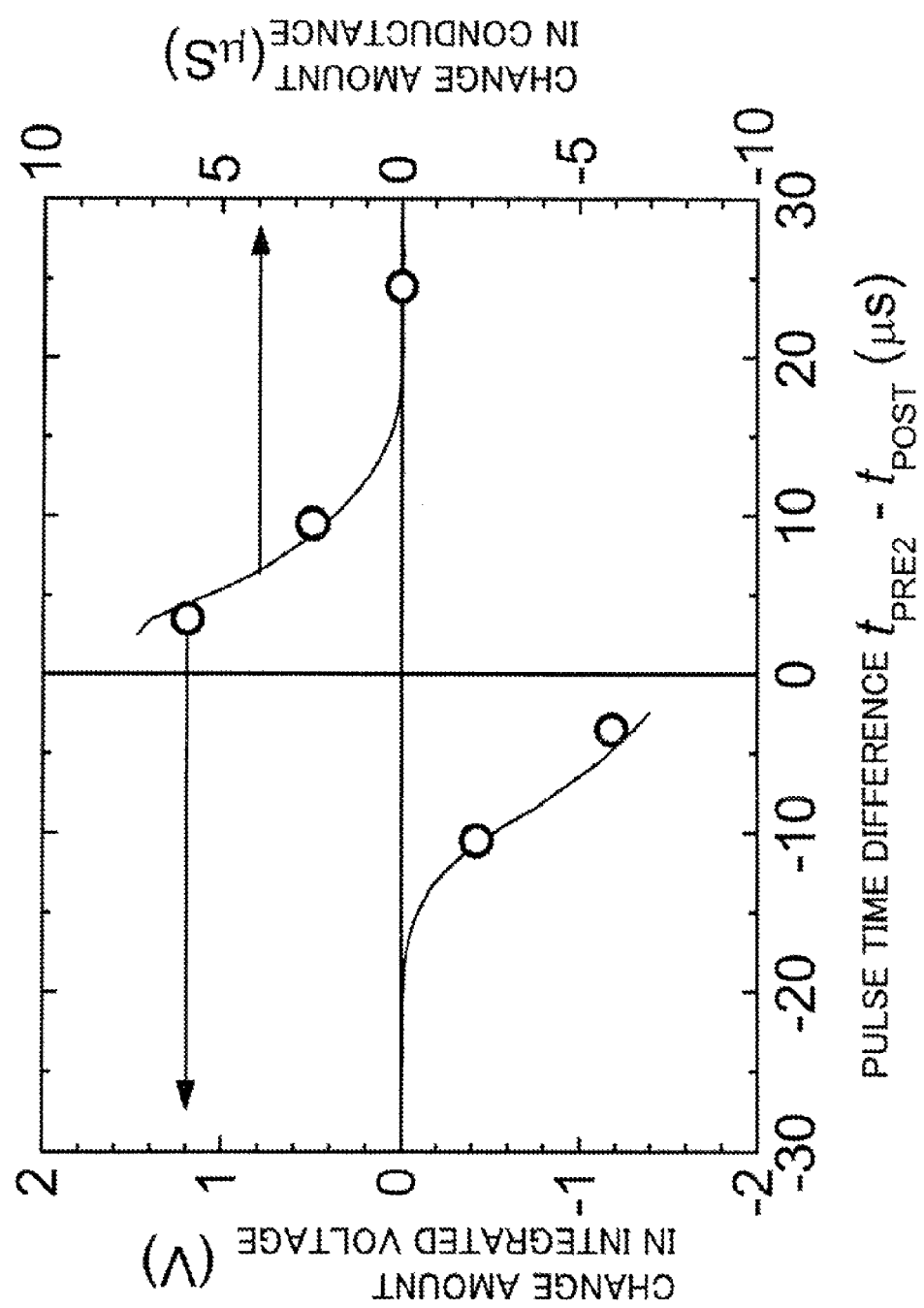
FIG. 9 is a view showing non-symmetric STDP in Example 1.

In the present example, the waveform of FIG. 7A was used as the non-linear waveform pulse voltage $V_{PRE}$, and the waveform of FIG. 7B was used as the switching pulse voltage $V_{POST2}$. A change in the integrated voltage $V_n$ before and after the pulses were applied, was measured while changing the timings of application of the pulses. On a left axis of FIG. 9, a change amount of the integrated voltage was represented. For reference, on a right axis of FIG. 9, a change amount which was the same as that of the conductance of FIG. 7C was plotted. The change amount of the integrated voltage indicated a characteristic corresponding to the change amount of the conductance. Therefore, it was revealed that the STDP characteristic of the variable resistance element 10 was reflected on the integral action of the integrating circuit 31.

Example 2

Evaluation of Synapse Circuit

Like Example 1, the synapse circuit of FIG. 6 was configured, and the STDP characteristic of the synapse circuit incorporating the above stated variable resistance element 10 was evaluated.

Figure 10A:
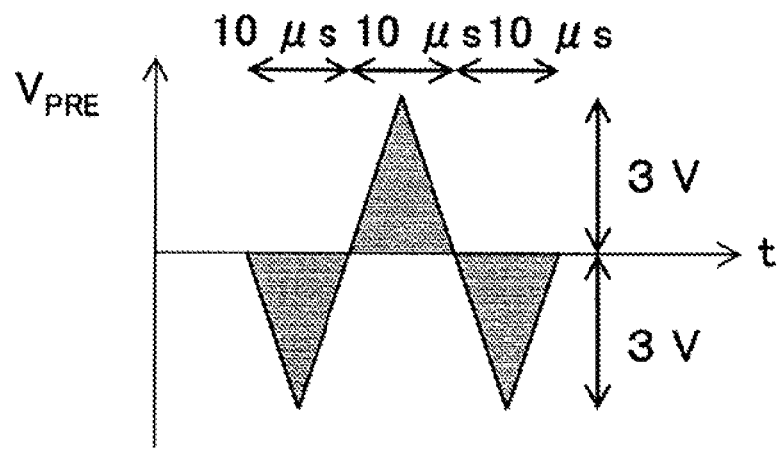
FIG. 10A is a view showing a shape of a mexican-hat pulse voltage used as the first input signal voltage in Example 2.
Figure 10B:
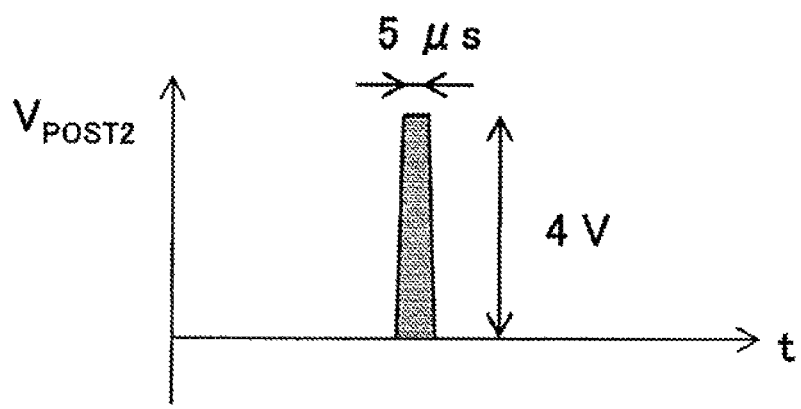
FIG. 10B is a view showing a shape of a square wave pulse voltage used as the second input signal voltage in Example 2.

The waveform of FIG. 10A was used as the non-linear waveform pulse voltage $V_{PRE}$ and the waveform of FIG. 10B was used as the switching pulse voltage $V_{POST2}$. Under this condition, the change in the conductance (inverse number of resistance value) of the variable resistance element 10 before and after the pulse voltages were applied was measured. As a result, the symmetric STDP characteristic of FIG. 14C was obtained as indicated by a left axis of FIG. 10C.

(Evaluation of Integral Action)

Next, like Example 1, a circuit in which the integrating circuit 31 was connected to one synapse circuit 20, as shown in FIG. 8, was fabricated. Using this circuit, the change in the integral action which was caused by the change in the resistance value of the variable resistance element 10, due to the STDP, was evaluated based on the integrated voltage $V_n$ after the non-linear waveform pulse voltage $V_{PRE}$ was applied for 20 microseconds.

Figure 10C:
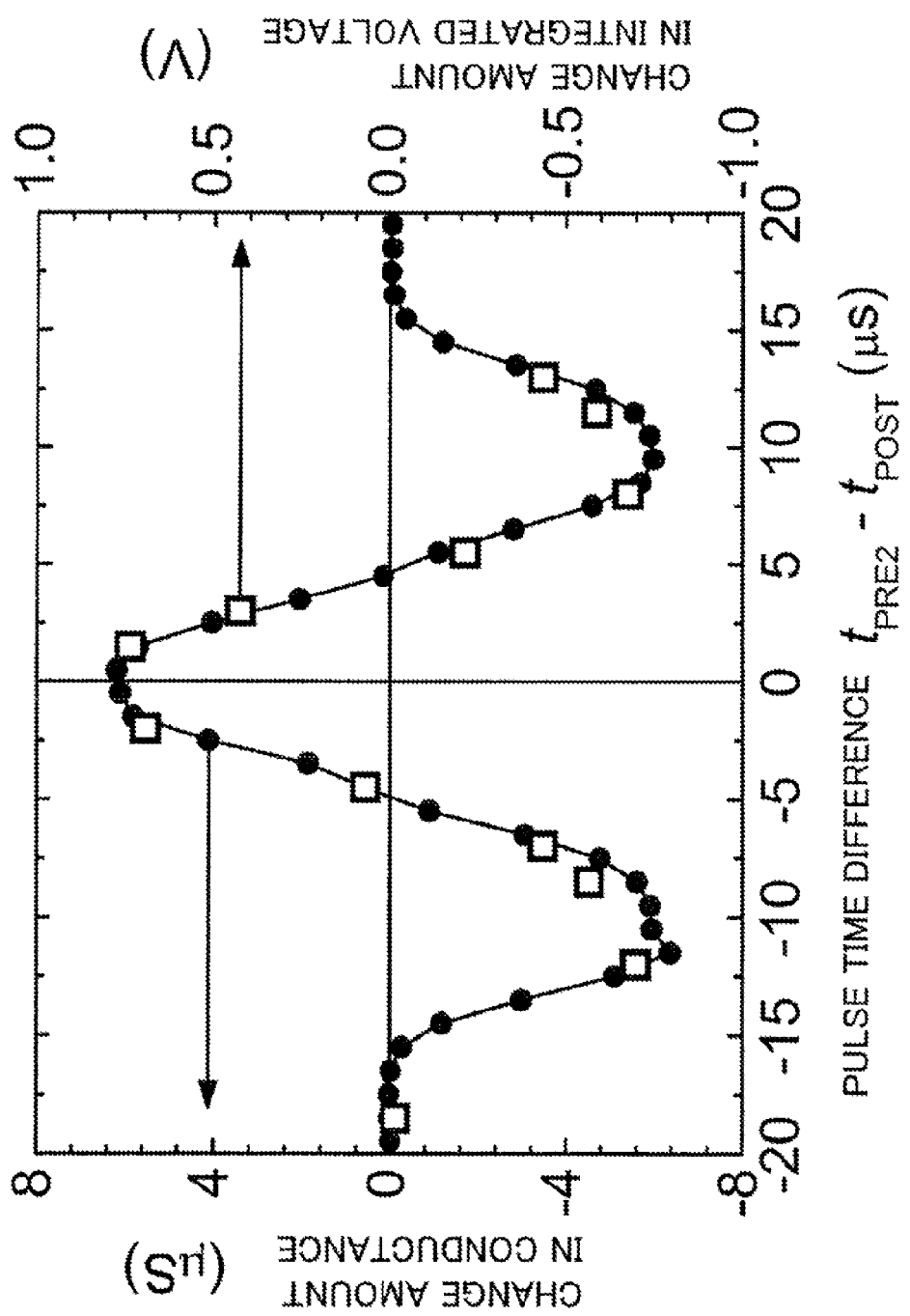
FIG. 10C is a view showing symmetric STDP in Example 2.

On a right axis of FIG. 10C, a change amount of the integrated voltage was represented. It was found that the change amount of the integrated voltage indicated a characteristic corresponding to a change amount of the conductance, and the symmetric STDP characteristic of the variable resistance element 10 was reflected on the integral action of the integrating circuit 31.

The present invention is effectively used in a weight updating operation in a neural network circuit.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A learning method of a neural network circuit including a plurality of neural network circuit elements which are interconnected,
wherein each of the plurality of neural network circuit elements includes:
at least one synapse circuit which receives an input a signal, as a first input signal, output from another neural network circuit element; and
one neuron circuit which receives as an input a signal output from the at least one synapse circuit,
wherein the synapse circuit includes a variable resistance element which includes:
a semiconductive layer having a first electrode; and a second electrode;
a ferroelectric layer formed on a main surface of the semiconductive layer; and
a control electrode formed on the ferroelectric layer, a resistance value between the first electrode and the second electrode changing in response to an electric potential difference between the first electrode and the control electrode,
wherein the neuron circuit includes a waveform generating circuit for generating a predetermined pulse voltage, the predetermined pulse voltage being a bipolar sawtooth pulse voltage or a mexican-hat pulse voltage, and the first input signal has a waveform of the predetermined pulse voltage,
wherein the method comprises:
for a period having a predetermined duration before and after a temporal mid point of a waveform of the predetermined pulse voltage generated within the neural network circuit element including the variable resistance element, inputting the first input signal from another neural network circuit element to the control electrode of the variable resistance element, to change the resistance value of the variable resistance element due to an electric potential difference generated between the first electrode and the control electrode which occurs depending on an input timing of the first input signal with respect to a period during which the first input signal is input to the control electrode of the variable resistance element.

2. The learning method of the neural network circuit according to claim 1,
wherein the synapse circuit includes a first switch for performing switching between a state in which the first input signal input to the synapse circuit is permitted to be input to the control electrode of the variable resistance element and a state in which the first input signal input to the synapse circuit is inhibited from being input to the control electrode of the variable resistance element, and
wherein the neuron circuit generates a second signal for causing the first switch to perform switching to form a state in which the first input signal input to the synapse circuit is permitted to be input to the control electrode of the variable resistance element for the period having the predetermined duration before and after the temporal mid point of the waveform of the predetermined pulse voltage.

3. The learning method of the neural network circuit according to claim 1,
wherein the neuron circuit includes:
an integrating circuit for integrating a value of a current flowing through the variable resistance element included in the at least one synapse circuit; and
a delay circuit for delaying the predetermined pulse voltage generated in the waveform generating circuit for a predetermined time and outputting the delayed predetermined pulse voltage as a signal output from the neural network circuit element, and
wherein the waveform generating circuit generates the predetermined pulse voltage corresponding to the integrated current value generated in the integrating circuit.

4. The learning method of the neural network circuit according to claim 1,
wherein the synapse circuit includes a second switch one end of which is connected to a first reference voltage source and the other end of which is connected to the first electrode of the variable resistance element, and
wherein the second switch connects the first reference voltage source to the first electrode of the variable resistance element for a period during which the first input signal is input to the synapse circuit.

5. A neural network circuit comprising a plurality of neural network circuit elements which are interconnected,
wherein each of the plurality of neural network circuit elements includes:
at least one synapse circuit which receives as an input signal, as a first input signal, output from another neural network circuit element; and
one neuron circuit which receives as an input a signal output from the at least one synapse circuit,
wherein the synapse circuit includes a variable resistance element which includes:
a semiconductive layer having a first electrode and a second electrode;
a ferroelectric layer formed on a main surface of the semiconductive layer; and
a control electrode formed on the ferroelectric layer, a resistance value between the first electrode and the second electrode changing in response to an electric potential difference between the first electrode and the control electrode,
wherein the neuron circuit includes a waveform generating circuit for generating a predetermined pulse voltage, the predetermined pulse voltage being a bipolar sawtooth pulse voltage or a mexican-hat pulse voltage, and the first input signal has a waveform of the predetermined pulse voltage,
wherein the neural network circuit is configured such that, for a period having a predetermined duration before and after a temporal mid point of the waveform of the predetermined pulse voltage generated within the neural network circuit element including the variable resistance element, the first input signal from another neural network circuit element is input to the control electrode of the variable resistance element, to change the resistance value of the variable resistance element due to an electric potential difference generated between the first electrode and the control electrode which occurs depending on an input timing of the first input signal with respect to a period during which the first input signal is permitted to be input to the control electrode of the variable resistance element.

6. The neural network circuit according to claim 5,
wherein the synapse circuit includes a first switch for performing switching between a state in which the first input signal input to the synapse circuit is permitted to be input to the control electrode of the variable resistance element and a state in which the first input signal input to the synapse circuit is inhibited from being input to the control electrode of the variable resistance element, and
wherein the neuron circuit generates a second signal for causing the first switch to perform switching to form a state in which the first input signal input to the synapse circuit is permitted to be input to the control electrode of the variable resistance element for the period having the predetermined duration before and after the temporal mid point of the waveform of the predetermined pulse voltage.

7. The neural network circuit according to claim 5,
wherein the neuron circuit includes:
an integrating circuit for integrating a value of a current flowing through the variable resistance element included in the at least one synapse circuit; and
a delay circuit for delaying the predetermined pulse voltage generated in the waveform generating circuit for a predetermined time and outputting the delayed predetermined pulse voltage as a signal output from the neural network circuit element, and
wherein the waveform generating circuit generates the predetermined pulse voltage corresponding to the integrated current value generated in the integrating circuit.

8. The neural network circuit according to claim 5,
wherein the synapse circuit includes a second switch one end of which is connected to a first reference voltage source and the other end of which is connected to the first electrode of the variable resistance element, and
wherein the second switch connects the first reference voltage source to the first electrode of the variable resistance element for a period during which the first input signal is input to the synapse circuit.

9. The learning method of the neural network circuit according to claim 1, wherein:
the first electrode is formed on or above the semiconductive layer, and
the second electrode is formed on or above the semiconductive layer.

10. The learning method of the neural network circuit according to claim 1, wherein:
the first electrode is formed on or above a first surface of the semiconductive layer, the first surface being opposite to the main surface,
the second electrode is formed on or above the first surface of the semiconductive layer, and
first and second electrodes, the semiconductive layer, the ferroelectric layer and the control electrode are stacked in this order.

11. The neural network circuit according to claim 5, wherein:
the first electrode is formed on or above the semiconductive layer, and
the second electrode is formed on or above the semiconductive layer.

12. The neural network circuit according to claim 5, wherein:
 the first electrode is formed on or above a first surface of the semiconductive layer, the first surface being opposite to the main surface,
 the second electrode is formed on or above the first surface of the semiconductive layer, and
 first and second electrodes, the semiconductive layer, the ferroelectric layer and the control electrode are stacked in this order.

* * * * *